(12) United States Patent
Ugolin

(10) Patent No.: US 8,906,203 B2
(45) Date of Patent: Dec. 9, 2014

(54) METHOD FOR THE DESALINATION OR PURIFICATION OF WATER BY DISTILLATION OF A SPRAY (SPRAY PUMP)

(76) Inventor: Nicolas Ugolin, Paris (FR)

( * ) Notice: Subject to any disclaimer, the term of this patent is extended or adjusted under 35 U.S.C. 154(b) by 569 days.

(21) Appl. No.: 13/060,131

(22) PCT Filed: Aug. 20, 2009

(86) PCT No.: PCT/FR2009/001019
§ 371 (c)(1),
(2), (4) Date: Apr. 11, 2011

(87) PCT Pub. No.: WO2010/020723
PCT Pub. Date: Feb. 25, 2010

(65) Prior Publication Data
US 2011/0174605 A1    Jul. 21, 2011

(30) Foreign Application Priority Data

Aug. 20, 2008  (FR) ...................................... 08 04656
Jan. 21, 2009  (FR) ...................................... 09 00258

(51) Int. Cl.
*C02F 1/12*    (2006.01)
*C02F 1/14*    (2006.01)
(Continued)

(52) U.S. Cl.
CPC .. *B01D 1/18* (2013.01); *B01D 1/16* (2013.01);
*B01D 1/20* (2013.01); *C02F 1/06* (2013.01);
*C02F 1/12* (2013.01); *C02F 1/001* (2013.01);
*C02F 1/36* (2013.01); *C02F 1/444* (2013.01);
*Y10S 203/11* (2013.01); *Y10S 203/01* (2013.01);
*Y10S 203/18* (2013.01)
USPC .................. 203/10; 55/337; 95/279; 203/63;
203/90; 203/100; 203/DIG. 1; 203/DIG. 17;
210/512.1; 210/695; 210/774; 210/787; 210/806;
239/8; 239/13

(58) Field of Classification Search
USPC ....... 159/4.01, 16.1, 48.1, 903, 906, DIG. 20,
159/DIG. 26; 203/10, 63, 90, 100, DIG. 1,
203/DIG. 17; 210/512.1, 695, 748.02, 774,
210/787, 806; 55/337; 239/8, 13; 95/279
See application file for complete search history.

(56) References Cited

U.S. PATENT DOCUMENTS 2,887,390 A * 5/1959 Coulter et al. ................. 426/588
3,039,107 A * 6/1962 Bradford ....................... 159/48.1
(Continued)

FOREIGN PATENT DOCUMENTS

FR      2902666 A1    12/2007
FR      2923731     *  1/2008
(Continued)

OTHER PUBLICATIONS
International Search Report, dated Mar. 17, 2010, from corresponding PCT application.

*Primary Examiner* — Virginia Manoharan
(74) *Attorney, Agent, or Firm* — Young & Thompson

(57) ABSTRACT

A system enables the use of solar heat energy together with electromagnetic energy and optionally energy produced during fermentation of organic products to produce fresh water from salt water, wastewater and water vapor contained in the atmosphere. The resulting fresh water can optionally be rendered drinkable by adding mineral salts at the desired concentration. A method and reactors combine electromagnetic and solar heating steps and optionally heat exchanges with a hot gas originating from combustion, to evaporate droplets of a spray produced from salt water or wastewater. The vapor obtained is separated from the salt particles or agglomerated impurities during evaporation using a cyclone system. The vapor can then be transported over a large distance before being condensed by bearings, in order to separate the water from any additives or impurities that may be present. Additives can be used to lower the vapor pressure of the liquid water and to facilitate droplet fractionation.

15 Claims, 16 Drawing Sheets

(51) Int. Cl.
    *B01D 1/14*     (2006.01)
    *B01D 1/16*     (2006.01)
    *B01D 3/00*     (2006.01)
    *B05D 1/00*     (2006.01)
    *B01D 1/18*     (2006.01)
    *B01D 1/20*     (2006.01)
    *C02F 1/06*     (2006.01)
    *C02F 1/00*     (2006.01)
    *C02F 1/36*     (2006.01)
    *C02F 1/44*     (2006.01)

(56) References Cited

U.S. PATENT DOCUMENTS

| | | |
|---|---|---|
| 3,147,598 A | 9/1964 | Wilson |
| 3,974,039 A * | 8/1976 | Frohner et al. ............... 203/7 |
| 4,323,424 A * | 4/1982 | Secunda et al. ............... 159/48.1 |
| 4,352,717 A * | 10/1982 | Watanabe et al. ............ 159/4.06 |
| 5,509,996 A * | 4/1996 | Assaf ............................ 159/48.2 |
| 5,534,118 A * | 7/1996 | McCutchen ................... 202/205 |
| 6,299,735 B1 * | 10/2001 | Lumbreras ....................... 203/10 |
| 2003/0198849 A1 * | 10/2003 | Hampden-Smith et al. ..... 429/30 |
| 2006/0247122 A1 * | 11/2006 | Hampden-Smith et al. ... 502/101 |
| 2009/0020481 A1 | 1/2009 | Bailie et al. |

FOREIGN PATENT DOCUMENTS

| | | | |
|---|---|---|---|
| RU | 2116137 | * | 7/1998 |
| SU | 1175557 | * | 8/1985 |
| SU | 1194495 | * | 11/1985 |
| WO | 2007/027918 A2 | | 3/2007 |
| WO | 2009/102404 A1 | | 8/2009 |

* cited by examiner

METHOD FOR THE DESALINATION OR PURIFICATION OF WATER BY DISTILLATION OF A SPRAY (SPRAY PUMP)

BACKGROUND OF THE INVENTION

There are two main types of methods for producing fresh water from salt water.

The most widely used methods are based on a principle of reverse osmosis or ultrafiltration. These methods consist in filtering the salt water through semi-permeable membranes which allow the water to pass through but stop the ions (primarily sodium, potassium and chlorine). By applying pressure higher than the osmotic pressure, the water passes through the semipermeable membrane, thus enabling "filtration" of the ions and the obtainment of desalinated water. These methods are very energy-consuming, and, furthermore, the ultrafiltration membranes used are themselves very costly and have limited service lives, which further increases the cost of the fresh water produced. In addition, it is often necessary to use chelating agents prior to filtration in order to trap the ions likely to contaminate the membranes. In addition to increasing the cost per liter of water produced, these chelating agents, which are harmful to the environment, end up in the brine. This entails additional costs for retreating the brine and, depending on circumstances, pollution of the environment, adding to the already significant pollution caused by the brine.

In addition to these ultrafiltration and osmosis methods, distillation methods exist, which consist in producing vapour by bringing liquid water to the boiling point, and in then condensing the water vapour in order to obtain pure water.

These distillation methods are generally very costly in terms of heat energy. This energy is most often supplied in the form of electricity, by means of resistors, most often produced from fossil, nuclear or hydroelectric fuels. The amount of energy required to produce one $m^3$ of water using these methods is very significant, which, in addition to a high production cost, produces pollution and requires the required energy to be available locally.

Alongside conventional heat distillation, solar heat distillation is sometimes used. This method consists in using solar energy to produce the water vapour that will be condensed. Although the latter method uses free energy to produce water vapour, the surface area required to produce one $m^3$ per day is very significant: more than 100 $m^2$. Furthermore, the required production equipment is difficult to move about.

Numerous wastewater purification methods are similar to desalination methods using filtration, with even more significant constraints on the poisons in the membranes and filters, which are found in even more significant amounts in wastewater. However, the majority of these methods aim to sufficiently purify the water prior to discharging same into the natural environment and not to produce water that is sufficiently pure for household or drinking purposes. In addition, in wastewater purification methods, treatment of the biodegradable organic compounds most frequently involves methods consisting in the aerobic degradation of the organic compounds, with a release of CO2; this involves the loss of the energy potential of said compounds. Wastewater methanisation methods which are compatible with fresh water recycling are not very widespread and are very difficult to implement on a small scale.

Finally, in the production of fresh water, very few methods take account of the potential represented by the water vapours as well as the volatile organic compounds present in or released into the atmosphere by household human activities (food cooking, showering, aerosol container gases . . . ). For example, human intestinal gases or gases resulting from animal husbandry account for a significant portion of the methane present in the atmosphere. It is interesting to note that water vapour and methane represent the two greenhouse effect gases, and therefore the impact thereof is the most significant, well ahead of CO2.

Capturing these gases in order to convert same into liquid water and CO2, for example, in addition to producing liquid fresh water, which is essential for many regions, would enable involvement in slowing down the increase in the primary greenhouse effect gases in the atmosphere and to therefore control global warming.

Numerous household air exhaust systems (toilet bowl exhaust, CMV exhaust, range hood exhaust, agricultural building exhaust . . . ) enable household gases to be exhausted (water vapour, methane . . . ) from the buildings. On the other hand, few systems enable a recycling and upgrading of these gases which is compatible with the household environment.

The method and equipment described in the remainder of this document enable sterile, fresh water (without any microorganisms) to be produced from salt water or dirty water, accompanied by the atmospheric water vapours and volatile organic compounds present in the atmosphere self-sufficiently in terms of energy.

SUMMARY OF THE INVENTION

The present invention relates to a method for desalinating and purifying water by means of a distillation method using solar heat energy, microwave energy and ultrasound energy in order to produce fresh water from liquid salt and/or waste water and atmospheric water vapour. In addition the method can be used to even more efficiently produce fresh water from wastewater by completing said method with wastewater pre-filtration steps using energy produced by the fermentation of a portion of the organic compounds contained in the wastewater. The additional energy produced by the fermentation process enables the water vapours and methane vapours released by household or agricultural activity to be captured and converted into purified liquid water.

Operating Principle

The invention consists of a method and devices comprising a series of functional units enabling water vapour to be produced from salt water or dirty water, while limiting the energy cost, and in then condensing the vapour produced into desalinated or purified water.

The desalination and/or wastewater purification method can be broken down into 5 main steps, which can be consecutive or concomitant:

a) a step of filtering the water, b) a step of breaking down the water into drops having a size of between 1 millimeter and 1 micrometer in diameter, in order to form system of suspended drops, such as a spray or an aerosol, c) a step of evaporating the water contained in said drops to produce vapours, including water vapour, salt crystals and agglomerated particles.

d) a step of separating the vapours, salt crystals and agglomerated particles, e) a step of condensing said desalinated and purified water vapour with optional breakdown of the resulting vapours.

Figure 1:
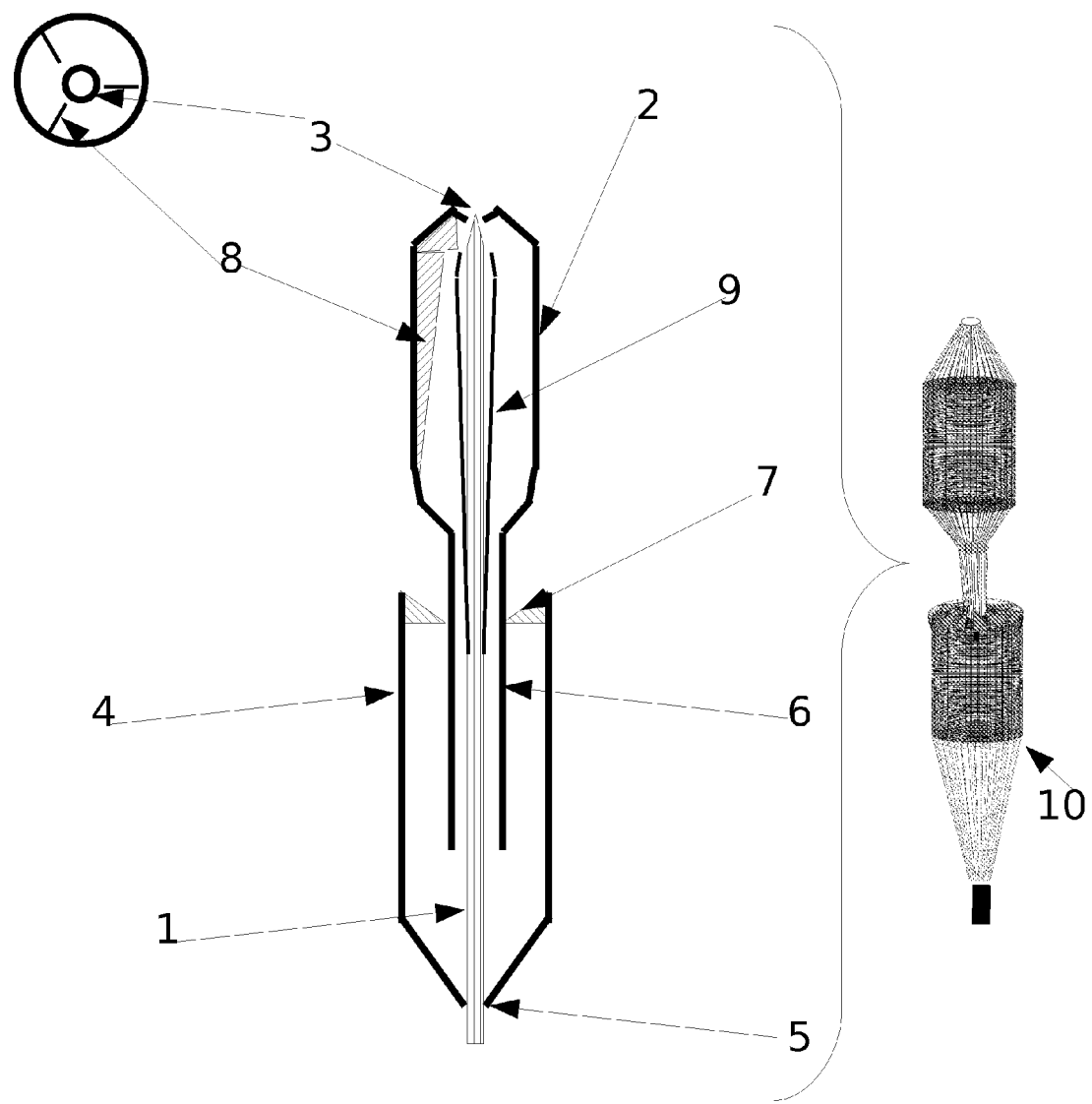
FIG. 1 is a schematic view of a spray cyclone system, including a wick cyclone.

DETAILED DESCRIPTION OF THE INVENTION 1.1 In order to limit the energy required to evaporate liquid salt water or dirty water into vapour, the liquid water is first broken down into fine droplets having a size of between 1 mm and 1 micrometer in diameter.

1.2 In certain embodiments, the breakdown of the liquid water will be carried out using a spray or mist maker, using the pressure of the liquid through a spray nozzle, or a gas stream to cause the water to fractionate into droplets. In certain embodiments, the mist maker will consist of the elements of a low-pressure paint gun or else the elements comprising snowmakers. In a preferred embodiment, the mist maker will consist of a porous or non-porous wick FIG. 1.1. The porous wick, for example, consists of a frit (organic or metallic mineral) of synthetic or natural fibres; in some cases, it will enable the water to be filtered. The wick will optionally be perforated over the entire length thereof, with longitudinal capillaries preferably measuring less than two millimeters in diameter. The porous wick enables the water to be pumped by capillary action through the pores, tubing and capillaries. The wick may be sheathed over a portion thereof by an impermeable membrane. A relatively cone or shell-shaped nozzle will be arranged around the wick FIG. 1.2 and will optionally comprise vanes FIG. 1.8 enabling a linear flow of the gases in the nozzle, thereby preventing formation of a vortex. The nozzle will be made of plastic, metal or any other material capable of being structured. The top of the nozzle will be perforated with a hole FIG. 1.3 (pore of the nozzle) opposite the tip of the wick. The nozzle extends the centre cylinder FIG. 1.6, thereby forming the gas upflow duct of a cyclone FIG. 1.4, and guides the flow rising from the cyclone up to the nozzle inlet, so that column of gas rising from the cyclone is able to pass through the nozzle while enveloping the wick. The gas flow ensures that the liquids are suctioned owing to the negative pressure which forms at the opening situated at the upper end of the nozzle. As a matter of fact, by flowing out along the wick, the gas flow rising from the cyclone creates a negative pressure, according to Bernouilli's principle, which sucks the liquids through the wick. The suction thus creates a pumping phenomenon which enables the liquid to rise through and to the surface of the wick while at the same time being filtered. Liquid is then sucked by the rising gas up to the pore of the nozzle FIG. 1.3 where it is transformed into a spray, at the pore of the nozzle, by the expansion of the rising gas. The wick continues into the centre of the cyclone, within the column of rising gases of the cyclone, in order to possibly exit from the cyclone via the cone-shaped opening of the bottom of the cyclone FIG. 1.5. Upon exiting the cyclone, the wick feeds into a tank of water to be filtered, and may possibly emerge back out into the outside environment in order to draw water therefrom. The structure formed by the cyclone, the nozzle and the wick comprises a spray cyclone FIG. 1.10.

1.3 The wick is optionally held in place inside the nozzle and inside the cyclone by a suction tube FIG. 1.9, which continues into the upper portion of the spray cyclone, or into the entire cyclone. The suction tube encircling the wick increases the suction pressure at the tapered end of the wick.

1.4 The gas supply to the cyclone of the spray cyclone can be tangential, but is preferably longitudinal across the angled vanes FIG. 1.7. The angle of the vanes ensures the formation of a gas vortex descending into the cyclone. Upon arriving at the bottom of the cyclone, the vortex forms into a column of gas rising up to the centre of the cyclone along the wick, within the suction column.

Figure 2:
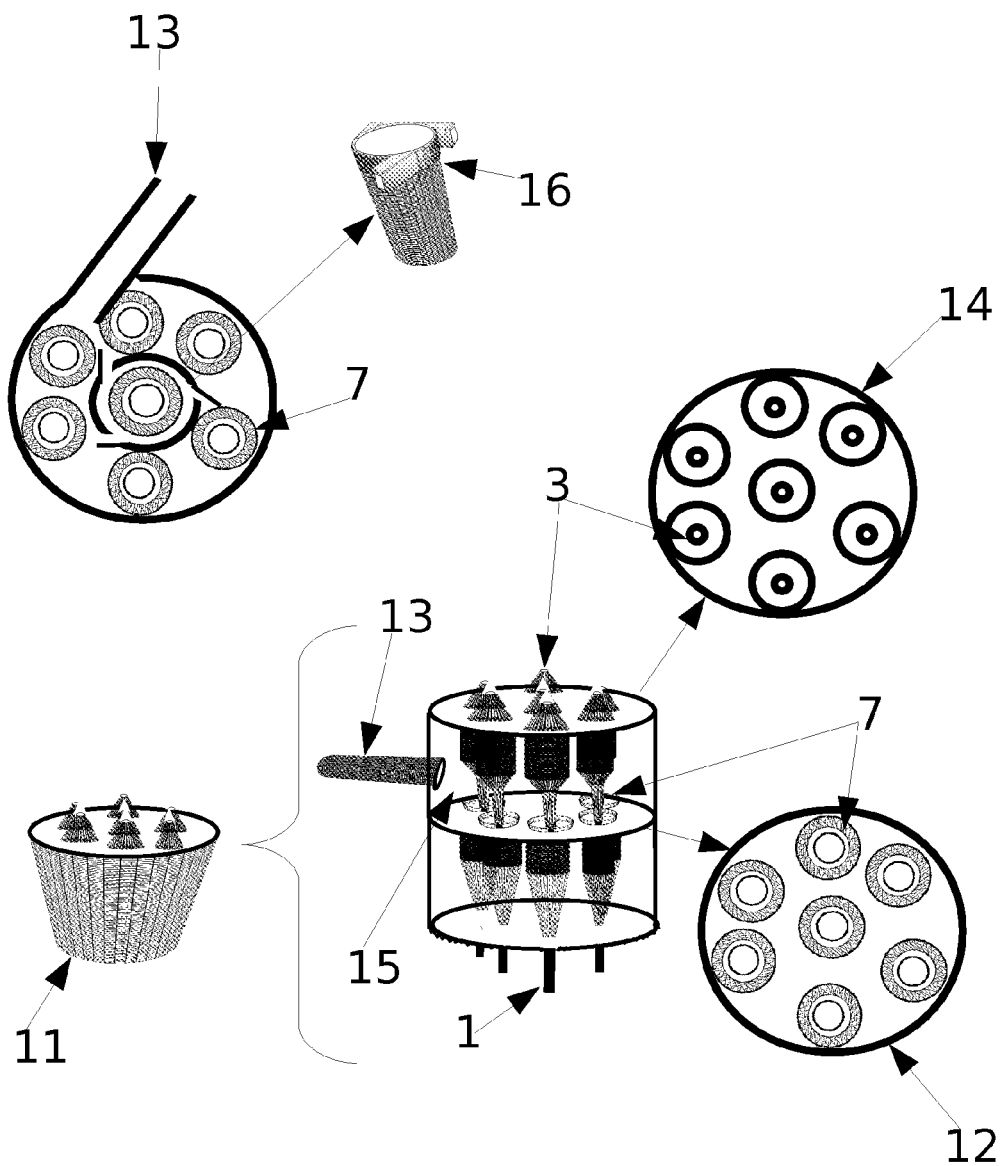
FIG. 2 is a schematic view of several cyclones arranged in a structure defining an air pump.

1.5 Several cyclones can be arranged in a structure that we shall call an air pump FIG. 2.11, so that the inlet vanes of the cyclones FIG. 2.7 form part of the floor FIG. 2.12 of the air compartment FIG. 2.15. The air is injected FIG. 2.13, preferably tangentially, into the air compartment of the air pump, in the direction opposite the angle of the cyclone supply vanes, so that it can effectively rush into the cyclones across said vanes. In certain embodiments, the air compartment of the air pump comprises inner structures, such as cylinders having openings opposite the direction of rotation of the gas vortex FIG. 2.16, so as to promote the entry of the gases into the centre cyclones. The spray cyclones open FIG. 2.3 into the ceiling of the air compartment FIG. 2.14, which likewise corresponds to the floor of the spray pump channel FIG. 3.17. At the outlet of each nozzle FIG. 2.3, a spray as well as a stream of air forms and rises up into the channel of the spray pump.

2.1 In another embodiment, the fractionation of the salt water or dirty water into droplets is carried out by means of ultrasonic waves having a frequency of between 1 kHertz and 20 MHertz, used alone or in addition to the cyclone sprays described in section 1.

2.2 In one particular embodiment, the ultrasound generator is a structure surrounding the channel of the spray pump. The ultrasound-emitting structure consists of a cylinder FIG. 3.18 made of metal, ceramic or any other material capable of effectively transmitting the ultrasound waves, and having a height of between 1 mm and 6 meters and a diameter of between 0.5 cm and 5 meters. The bottom of the cylinder is extended by a skirt having an inverted cone-shaped structure FIG. 3.19, semi-annular structure FIG. 3.20 or hemispherical rosette structure FIG. 3.21. The skirt is extended by a crown, at the edge, optionally angled towards an annular opening FIG. 3.22 surrounding the spray pump.

Figure 3:
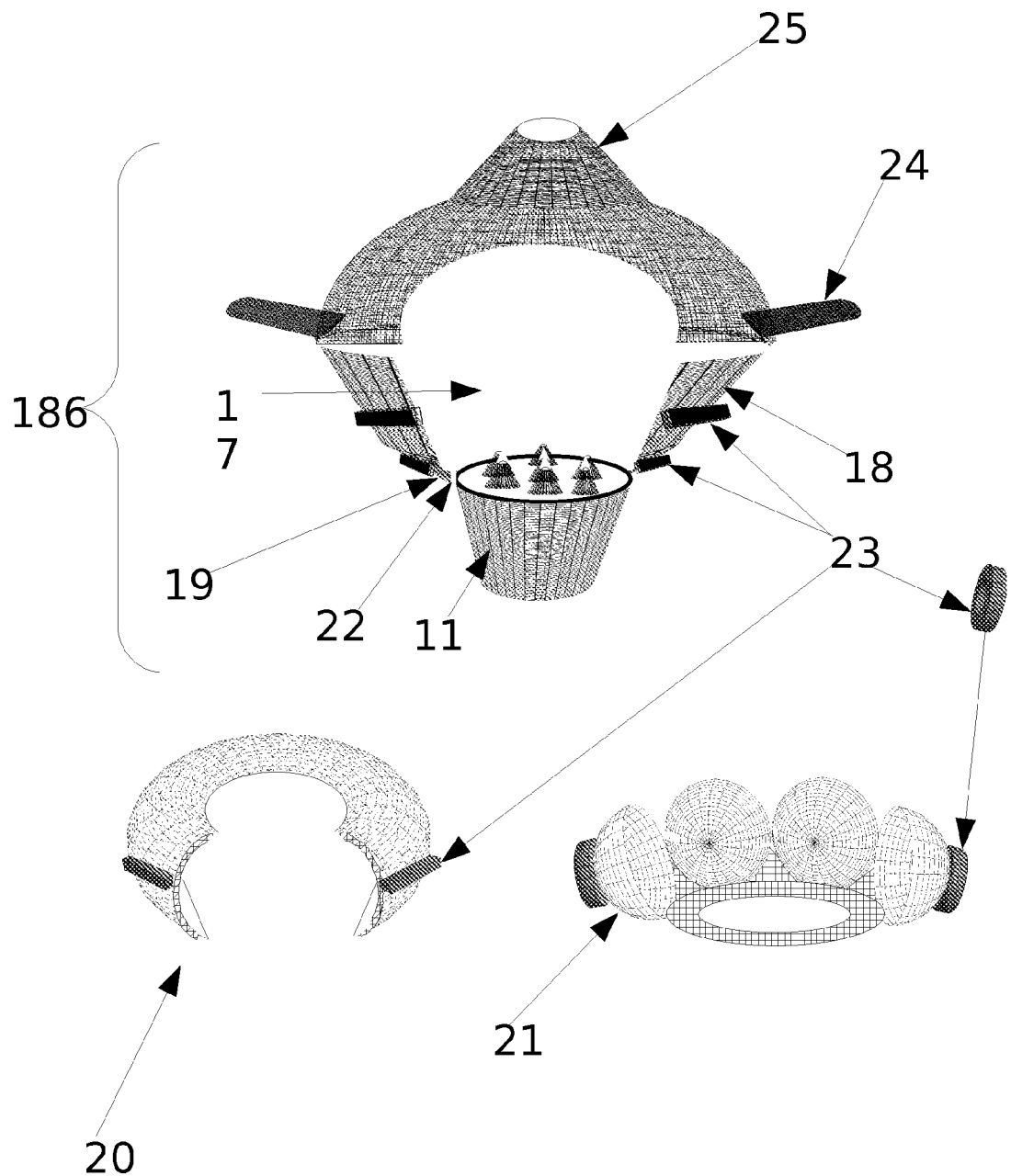
FIG. 3 is a schematic view of a spray pump channel and an ultrasound generator.

2.3 The ultrasound vibrations are horizontal, vertical or a combination of both types of movements, and are obtained by means of a source, which may be a piezo-electrical crystal system FIG. 3.23, an electromagnet or any other system enabling a vibrational movement to be obtained, or a sound at the desired frequencies. The ultrasound source will be connected to the emitting structure so as to transmit the vibrations thereto.

2.4 All or a portion of the walls of the ultrasound-emitting structure will possibly be sintered or roughened so as to increase the wettability thereof, in order to enable an even distribution of the liquid at the surface of same.

3.1 The cylindrical portion of the emitting structure will be sprayed owing to a hydraulic system FIG. 3.24. By flowing out along the walls of the cylinder, the water will be exposed to ultrasound waves. Under the effect of the ultrasound waves, cavities will form in the liquid. The bursting of the cavitation bubbles will result in the expulsion of high-speed droplets at the source of a spray or aerosol. The bursting of the cavitation bubbles is promoted when same come into contact with a surface; the change in direction of the flow, which is due to the skirt terminating the cylinder FIG. 3.19-20-21, promotes the contact of the cavitation bubbles with the surface of the emitting structure. The bursting of the cavitation bubbles produces a spray or an aerosol, in a generally perpendicular direction relative to the surface of the emitting structure, which is directed towards the channel of the spray pump. The flow rising up from the wick cyclones draws the aerosol formed into the channel of the spray pump.

3.2 The cylinder of the emitting structure can be sprayed by means of a hydraulic system fed by a diaphragm, peristaltic or centrifugal pump, or any other type of pump.

3.3 In certain embodiments, a siphon system uses a difference in level between the surface of the liquid being filtered and the outlet of the hydraulic system in order to pump the water towards the ultrasound-emitting structure.

3.4 The inlet to the hydraulic system will be provided with a filter, enabling the water being treated to be pre-filtered, which will preferably be a sintered structure for filtering the water which supplies the emitting structure.

3.5 Generally speaking, all of the units described in this document may be periodically or continuously connected to an ultrasound source in order to clean the pores and lines of the various elements of the system.

4.1 In a preferred embodiment, the sprays and/or aerosols are formed by a combination of wick cyclones and the ultrasound-emitting structure.

4.2 The sprays or aerosols formed by the wick cyclones and the ultrasound-emitting structure are captured at the head of the spray pump FIG. 3.25. The capture can be accomplished, for example, by a fan placed inside the pump head. The sprays or aerosols are then directed to the inlet FIG. 4.26 of one or more crystallisation cyclones FIG. 4.27, which are preferably supplied tangentially. A system of nested cyclones can optionally be used FIG. 15.239. The cyclone inlet is confluent with a wave guide FIG. 4.28, which enables an electromagnetic source to inject the desired electromagnetic frequencies into the sprays or aerosols entering the cyclone. On the one hand, the effect of the electromagnetic waves will be to evaporate the water contained in the droplets of the sprays or aerosols while crystallising the salts and agglomerating the impurities, and, on the other hand, to raise the temperature of the gases formed, and therefore the velocity thereof. A side effect of raising the temperature and evaporating the water will be that of sterilising the environment.

4.3 In a preferred embodiment, the electromagnetic energy will be supplied in the form of microwaves having a frequency preferably between 1 gigahertz and 700 gigahertz. These microwaves will preferably be produced by one or more magnetrons FIG. 4.29.

4.4 The accelerated heated gases form a vortex descending into the cyclone, and then the gases rise back up in a central flow column while the salts and agglomerated particles are discharged through the opening of the cyclone cone. These particles and salts are optionally recovered in a bag or special tank. The device for separating the vapours and salts and/or agglomerated particles can advantageously consist of several optionally nested and interconnected cyclones. This enables higher separation efficiency and, in addition, the action of the cyclones can be completed by particle filters which, without being exhaustive, include: felt, a beehive or cordierite foam structure, silicon carbide, etc.

Figure 4:
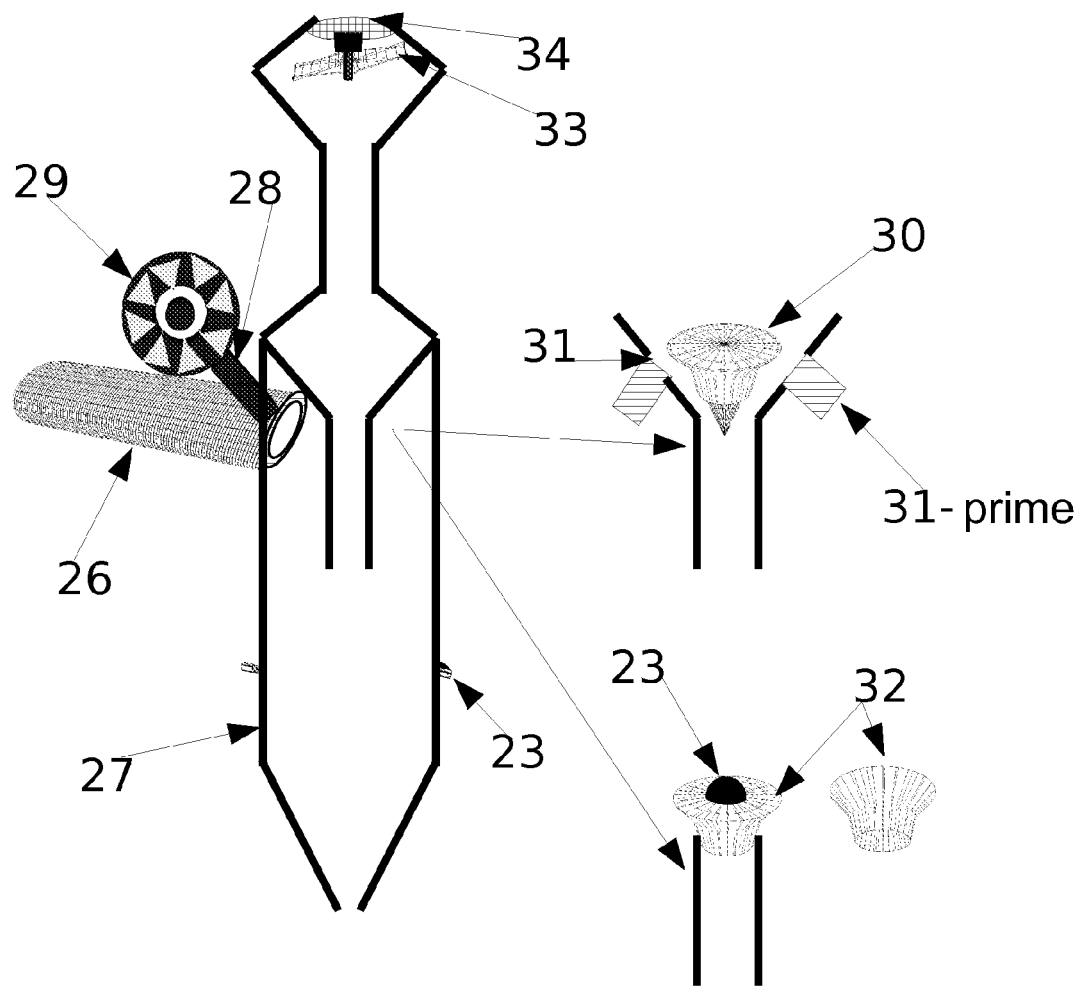
FIG. 4 is a schematic view showing a crystallization cyclone and a wave guide enabling electromagnetic frequencies to be injected therein.

4.5 In certain embodiments, at the outlet of the cyclone gas upflow duct, an inverted cone-shaped structure is arranged, having a relatively concave and optionally screen-like surface FIG. 4.30. The curvature and the screening of the inverted cone-shaped surface limits the passage of possible particles towards the top of the device, by imparting a curve to the path thereof, thereby directing same primarily towards the lateral slots FIG. 4.31 of the cyclone gas upflow duct. The lateral slots are optionally provided with vanes on the interior side of the cyclone FIG. 4.31-prime, which are oriented in the direction of rotation of the cyclone gas vortex, so as to block any outflow therefrom.

4.6 In a preferred embodiment, a particle filter FIG. 4.32, e.g., a beehive-type, cordierite or silicon carbide structure, is arranged at the top outlet of the cyclone, so as to filter the salt particles or impurities formed. The filter is optionally connected to an ultrasound source.

4.7 In certain embodiments, a fan is arranged above the gas upflow duct of the crystallization cyclone FIG. 4.33; the heat dissipated by the fan will be transferred to the gas, owing to a radiator arranged after the fan FIG. 4.34.

5.1 The air compartment of the spray pump is preferably supplied with dry and hot air.

5.2 In a preferred embodiment, the air is dried by lowering the temperature thereof. The preferred method of lowering the air temperature will consist in placing a cold body, having a temperature of between 1 and 35° C., along the path of the air which is injected into the air compartment of the spray pump.

Figure 5:
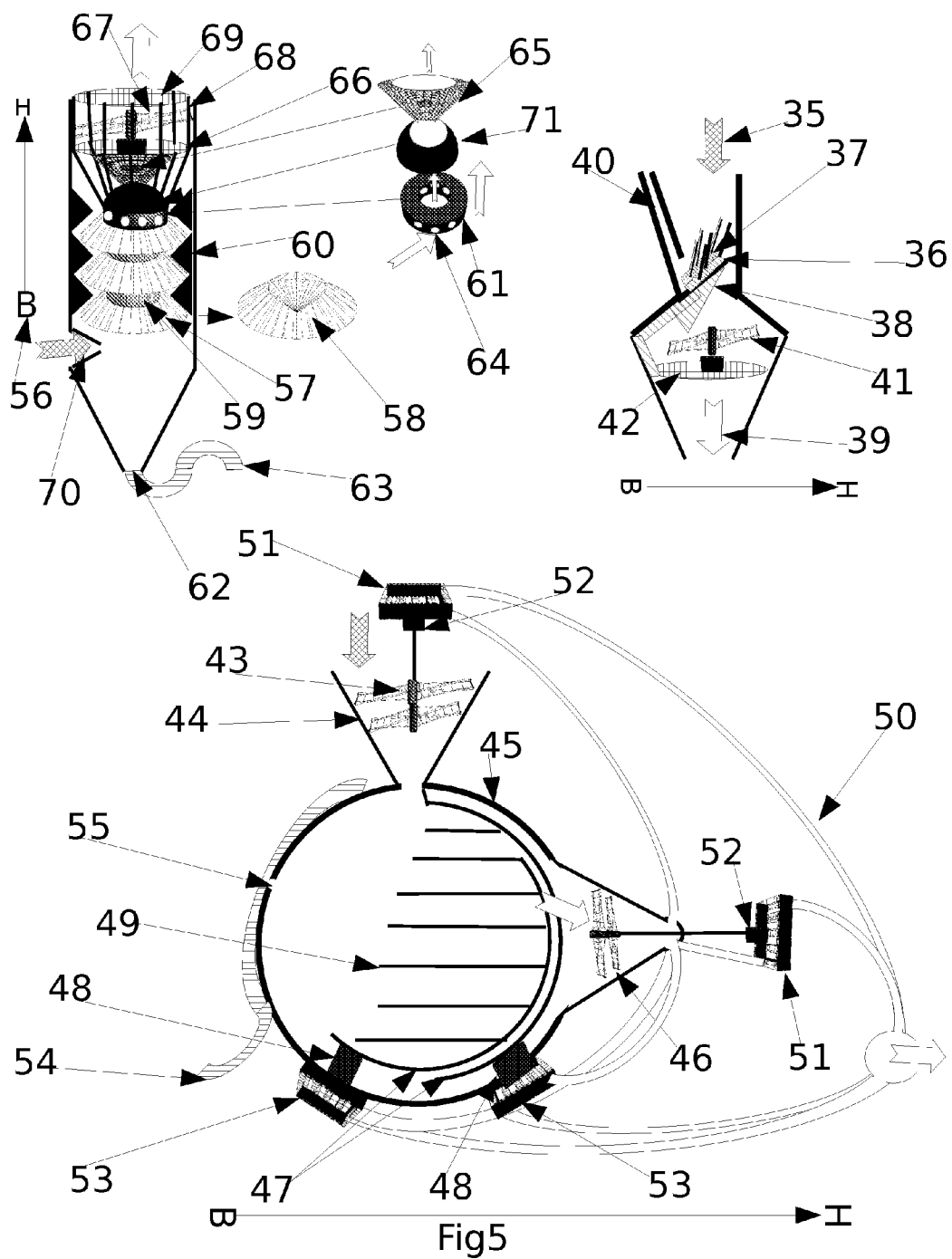
FIG. 5 is a schematic view showing a solution for lowering the air temperature, via Peltier elements, by placing a cold body along the path of the air which is injected into the air compartment of the spray pump.

5.3 In a yet more preferable embodiment, the cold body will consist of a Peltier element FIG. 5.36. The cold face of the element FIG. 5.37 will face the air intake FIG. 5.35 of the system. The Peltier element will be optionally angled in order to increase contact with the air, and will optionally be provided with spokes or fins. The water of condensation will be recovered, via a line FIG. 5.40, in a tank and added to the distilled water. An air-cooled radiator is placed on the hot side of the element FIG. 5.38. After having been cooled and dried, the air passes into the fins of the radiator where it recovers the dissipated thermal energy FIG. 5.39. A fan FIG. 5.41 is optionally placed after the Peltier element in order to draw in the air and push it back out towards the interior of the spray pump system. The air is likewise heated by the heat energy dissipated by the fan motor. A radiator FIG. 5.42 is optionally glued to the fan in order to better dissipate the heat; the entire device forms a Peltier air dryer.

5.4 In a preferred embodiment, the water contained in the air is condensed by an air convergence/divergence system. The air is first accelerated and compressed inside a cone FIG. 5.44 by a fan FIG. 5.43. The air is then slowed down abruptly and expanded inside a preferably spherical expansion tank FIG. 5.45, which results in a temperature drop and condensation of a portion of the air water vapour. The cooled air is then drawn in by a second fan FIG. 5.46. The cold face FIG. 5.47 of at least one Peltier element FIG. 5.48 is inserted between the second fan and the expansion tank, and kept at between 1 and 35° C. The rest of the water vapour contained in the air ends up being condensed upon contact with the cold face of the Peltier element. The cold face of the Peltier element optionally comprises bars FIG. 5.49 or cooling fins. The air next passes either in series, but preferably in parallel FIG. 5.50, into the tubes of the tubular cooling radiators FIG. 5.51-53 of the fans FIG. 5.43-46-52 and Peltier elements FIG. 5.48. The air is heated therein at the expense of the air passing between the fan blades and coming from the cold face of the Peltier elements.

In a particular embodiment, the cold face or faces FIG. 5.47 of the Peltier elements FIG. 5.48 consist of a metal structure lining the wall of the expansion tank so as to form two cold surfaces. The cold surfaces will preferably consist of two nested spherical metal structures connected to the cold poles of the Peltier element or elements. The structures will be optionally perforated with regular holes, such that said holes are staggered between the two metal structures. After expansion, the gas is condensed, and then the dry gas is drawn in by the second fan FIG. 5.46.

5.5 In certain embodiments, the expansion tank may consist of a cylinder containing a cold surface consisting of a staggered plate structure FIG. 5.57-58-59, arranged at the centre of the tank and connected to the cold face of one or more Peltier elements FIG. 5.61. The Peltier element or elements enable the plates to be kept at the desired temperature for condensing water. In certain embodiments, the plates are advantageously oriented downward. In a yet more preferable embodiment, the cylinder wall is serrated FIG. 5.60 so as to require the gases to flow as close as possible to the cold plates. The water which condenses on the plate flows out toward the drain outlet FIG. 5.62. The Peltier elements are advantageously arranged on a ring FIG. 5.64, thereby enabling a portion of the cold air rising along the cold plates FIG. 5.57-58-59 to pass to the centre of the ring FIG. 5.64. A thermal shield FIG. 5.65, e.g., in the shape of a hollow inverted cone and consisting of a heat-insulating material (ceramic, plastic, etc.), recovers the air entering the Peltier element ring FIG. 5.61 so as to convey the air directly to the radiator FIG. 5.66 of the fan motor FIG. 5.67. The radiator FIG. 5.71 of the ring-like Peltier elements, which consists of a highly heat-conductive material such as copper, aluminium (metal in general), is, for example, arranged on the hot face of the ring of elements, and encloses the thermal shield. Spokes FIG. 5.68 optionally connect the radiator of the Peltier element ring to the fan radiator. Additional radiators FIG. 5.69 can be introduced into the system in order to better dissipate the heat. Under the effect of the fan, the air is drawn in through the opening FIG. 5.70 of the system, and then the air cools and the contained water vapour condenses on the plates and falls towards the bottom of the system where it is recovered by a siphon. The dry air then rises, on the one hand, on the outside of the radiator of the Peltier element ring, and, on the other hand, through the pores of the element ring into the shield and towards the fan radiator. The air is then reheated by the heat dissipated by the various cooling radiators and spokes.

5.6 A condensed water drainage system FIG. 5.55-62 is arranged at the bottom of the expansion tank, which can be combined with a tank and siphon system FIG. 5.54-63, thus enabling the water to be recovered while at the same time preventing the gas from escaping.

6.1 The temperature of the dry air is raised by passing into solar heat panels and into ovens or solar concentrators.

6.2 In a preferred embodiment, the solar heat panels consist of soft and flexible materials such as plastic, polymers, silicone or any other material. The solar heat panel, for example, consists of sheets which are conjoined and structured so as to form a network or matrix of preferably spherical "bubble" cavities. The light-capturing system typically consists of two synthetic material sheets, an upper sheet transparent to light (visible, UV, infrared) FIG. 6.72, and a lower sheet FIG. 6.73 capable of reflecting light (such as synthetic material covered with aluminium or any other material capable of reflecting light), which is optionally lined with a heat-insulating membrane or fabric (Nomex (aramid fibre brand)/Kevlar fabrics, etc.) The synthetic material of the transparent sheet may be doped with silica or quartz crystals FIG. 6.74 (quantum particles) which, on the one hand, enable the UV rays to be transformed into visible and infrared light, which pass through plastics more easily, and, on the other hand, the transparency of the plastics to be increased at the various wavelengths. The two sheets are glued or welded to one another by preferably circular glue lines or weld seams, in order to form a network or matrix of preferably spherical cavities FIG. 6.75, which may be structured by the pressure of the gases flowing therein. A capillary FIG. 6.76 having a diameter of between 3 cm and 100 micrometers runs to the centre of each line of bubbles or matrix of bubbles. The capillaries can be made of a heat-resistant synthetic material (Kevlar, Kapton), or of metal. This may likewise involve a synthetic polymer containing metal particles, e.g., in the internal section of a bubble. These particles enable the heat to be better conveyed; the capillary portions external to the bubbles preferably do not contain any metal, so as to limit heat losses.

The bubbles of the matrix are preferably inflated with helium, argon, krypton, xeon or a mixture of these gases. The spherical shape of the bubbles makes it possible to converge the light FIG. 6.77 (irrespective of the position of the sun), entering through the transparent film FIG. 6.72 or reflected onto the film covered with an aluminium material FIG. 6.73, towards the capillary which passes through the middle thereof. The light converging on the wall of the capillaries increases the temperature of same and consequently that of the gas flowing therethrough. In certain embodiments, in order to prevent a risk of the bubbles bursting, all or a portion of the bubbles are interconnected via a channel. An interconnected set of bubbles are connected to a device enabling the pressure inside the bubbles to be controlled; for example, this involves an enclosure FIG. 6.78 one of the walls of which consists of an elastic membrane FIG. 6.79. This membrane expands when the pressure increases inside the bubbles, and absorbs the variations in the volume of the gas, which are due to the heat.

Figure 6:
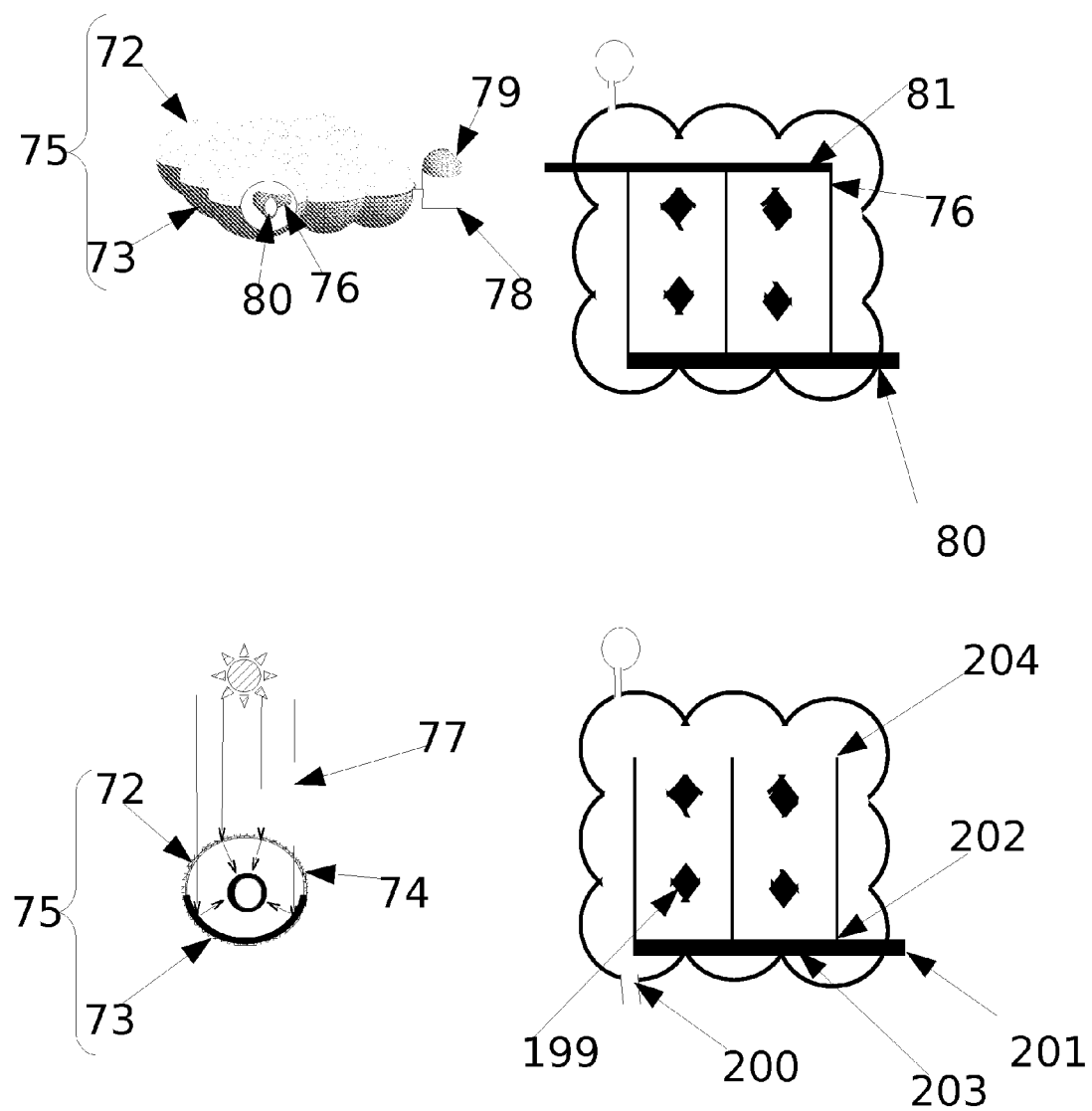
FIG. 6 is a schematic view showing how the temperature of the dry air can be raised by passing into solar heat panels and into ovens or solar concentrators.

One of the ends of each capillary is connected to an air inlet duct FIG. 6.80, and the other end of each capillary is connected to an air outlet duct FIG. 6.81. The sum of the surfaces of the open section of all of the capillaries will preferably be greater than the section of the inlet ducts. The entire device forms a flexible solar heat panel. The inlet duct of the flexible solar heat panel, for example, will be connected to the outlet of the Peltier air dryer, while the outlet duct can be directly connected to the spray pump or another air-heating system.

Figure 7:
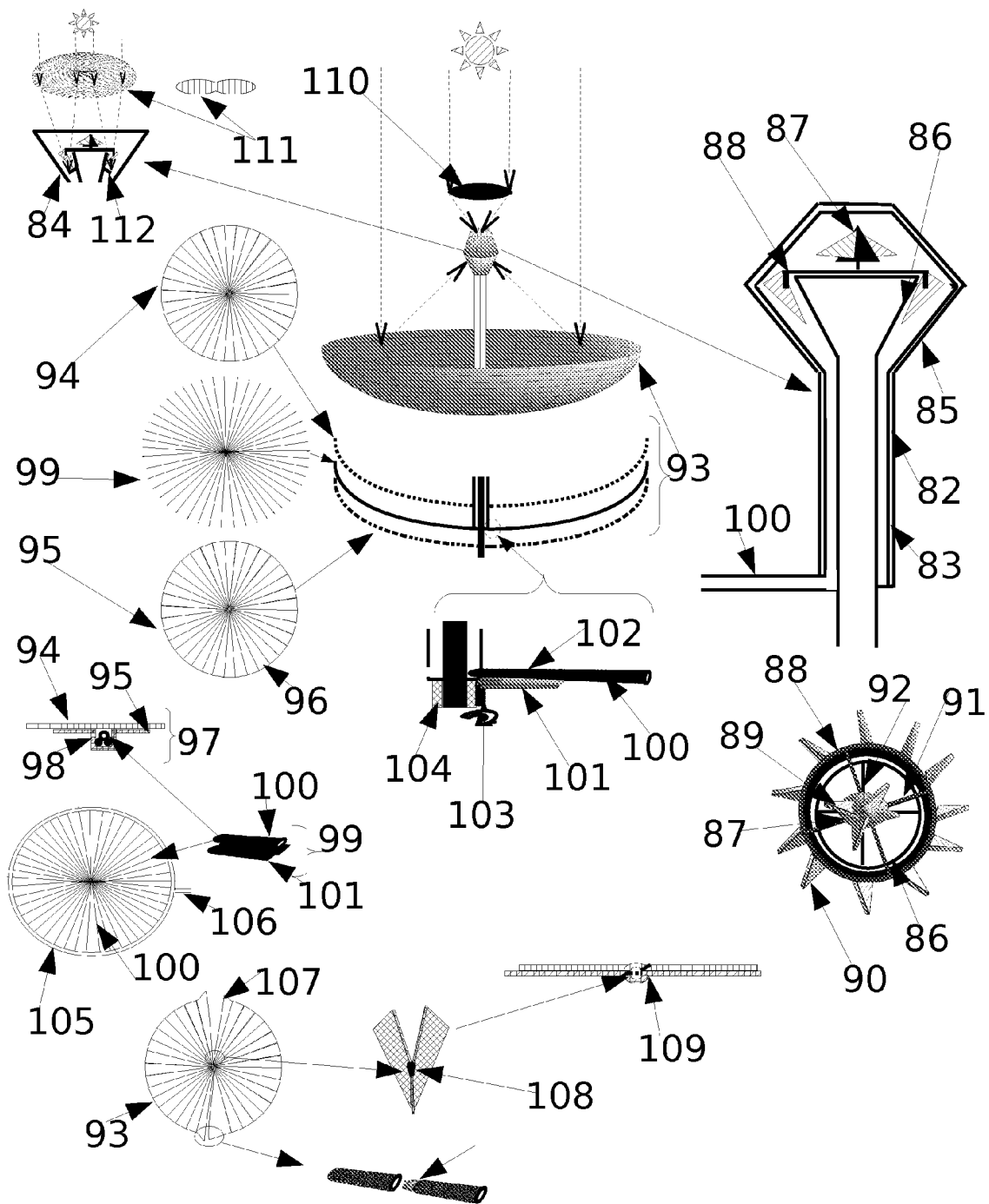
FIG. 7 is a schematic view showing heating air using a solar furnace or concentrator.

6.3 In certain embodiments, heating of the air is completed or ensured by a solar furnace or concentrator and consists of a deflector, which, for example, can be of parabolic, concave, ellipsoid or planar shape, etc. and which reflects the light onto a system of nested tubes in which the air being heated flows. The most outer portion of the system of tubes consists of a first insulating pipe FIG. 7.82 made of a transparent material allowing the widest possible spectrum of light (visible, UV, IR) to pass through. The walls of the insulating pipe may be doped with silica or quartz crystals (quantum particles) enabling the UV rays to be transformed into visible and infrared light and the transparency of the pipe wall to be increased at the various wavelengths (polyethersulfone, aramid). The walls of the insulating pipe may be lined and may contain an insulating gas (helium, argon, krypton, xeon or a mixture of these gases) in the inter-wall space FIG. 7.83. In certain embodiments, the insulating gas is replaced by a void established between the walls of the insulating enclosure. The insulating pipe is surmounted and closed by an enclosure of any shape. This enclosure is likewise transparent, having a single or double wall, and is preferably of an overall inverted cone FIG. 7.84 or symmetrically conical FIG. 7.85 shape. A pipe flared at the upper end thereof FIG. 7.86 is arranged at the centre of the structure formed by the insulating tube and the cavity surmounting same. This dark-coloured centre pipe (coated with black paint, black chrome, CERMET) will me bade of a preferably metallic, highly heat-conductive material. The centre pipe FIG. 7.86 will be surmounted FIG. 7.92, on the flared portion thereof, by a rotor FIG. 7.87 comprising vanes or fins FIG. 7.89. The rotor and the fins are preferably of a dark colour; the assembly will have a diameter smaller than the flared portion of the centre pipe. The first rotor FIG. 7.87 will be rigidly connected FIG. 7.91 to a second rotor FIG. 7.88, having a diameter larger than the flared portion of the centre pipe having vanes or fins FIG. 7.90 arranged around the flared portion of said centre pipe. The fins FIG. 7.89 of the first rotor are inverted relative to the fins FIG. 7.90 of the second rotor. The nested pipe structure will be arranged at the centre of a reflector forming a parabola (sphere cap) FIG. 7.93 comprising a reflective material on the inner surface thereof. The reflector will preferably consist of synthetic or natural membranes stretched over a frame, comprising flexible elements and tubular elements (heat-conductive), according to the principle of the tension of an umbrella canvas. The deflector will preferably be a continuity of two membranes, a reflecting membrane FIG. 7.94, e.g., a synthetic membrane containing or covered with aluminium, such as survival blankets, and an insulating membrane FIG. 7.95, such as Nomex (aramid fibre brand)/Kevlar fabrics, etc. The frame, for example, will consist of highly heat-conductive hollow and flexible tubes. In a preferred embodiment, each stiffener of the frame will consist of bundles of two or three elements, e.g., a highly heat-conductive element made of metal (copper, aluminium, etc.) FIG. 7.100 and one or two flexible tubes FIG. 7.101 made of carbon or a natural fibre, for example, such as bamboo fibres. The heat-conductive hollow tubes FIG. 7.100, glued to the inside face of the reflecting membrane, are connected to the insulating pipe FIG. 7.86, possibly by means of a flexible end piece FIG. 7.102. The flexible structural tubes FIG. 7.101 are connected to a cylindrical structure FIG. 7.104 in the area of the insulating pipe, possibly by means of a hinge FIG. 7.103 or a ball joint, thereby enabling the parabola to be folded over. The outer free end of the heat-conducting tubes FIG. 7.100 is optionally connected to a pipe forming the perimeter of the parabola FIG. 7.105, which is supplied with air by an intake FIG. 7.106. The size of the stiffeners assembled to the frame corresponds to the size of the arch of the spherical cap of the parabola, such that, once the frame has been positioned in the slots, the tubes of the frame impart a spherical parabola shape FIG. 7.93 to the membranes. To allow the parabola to be folded over, the membranes will be made in several parts FIG. 7.107 connected together by zip-fasteners (zippers) FIG. 7.108, Velcro fasteners or magnetic fasteners, etc. The fasteners will be concealed by covering flaps FIG. 7.109.

Once structured, the parabola deflects the light through the insulating pipe FIG. 7.82 and the enclosure FIG. 7.85, substantially in the area of the flaring of the centre pipe, just beneath the fins of the second rotor FIG. 7.88. Under the effect of the heat, the gas reheats and rises up into the enclosure (upward thermal current) while rotating the second rotor, which simultaneously actuates the first rotor as a result of the coupling. Above the enclosure FIG. 7.85, a lens FIG. 7.110 converges the light, which arrives vertically perpendicular to the enclosure, on the first rotor FIG. 7.87, and further heats the air before same is drawn into the centre pipe by the inverted blades of the first rotor. In a yet more advantageous embodiment, the lens vertically perpendicular to the enclosure FIG. 7.84 consists of a toric lens FIG. 7.111 causing the light to converge into a ring focussed on the blades FIG. 7.90 of the second rotor and onto a small radiator situated at the flaring of the centre pipe FIG. 7.112. The focal length of the parabola may advantageously be chosen so as to cause the light to substantially converge at this location. The convergence of the light immediately beneath the blades of the second rotor results in a large rise in temperature thereabout and therefore a higher rotor speed. The rising of the gases inside the insulating pipe results in the gases being drawn through the heat-conducting tubes of the parabola frame, thereby enabling the reflecting surface to be cooled while at the same time recovering the heat for the gas; the second membrane 7.95 acts as a thermal insulator for preventing the heat from dissipating into the ambient air. In certain embodiments, the rotors of the nested pipes may be coupled to an alternator or dynamo (generator) in order to produce an electrical current.

Figure 13:
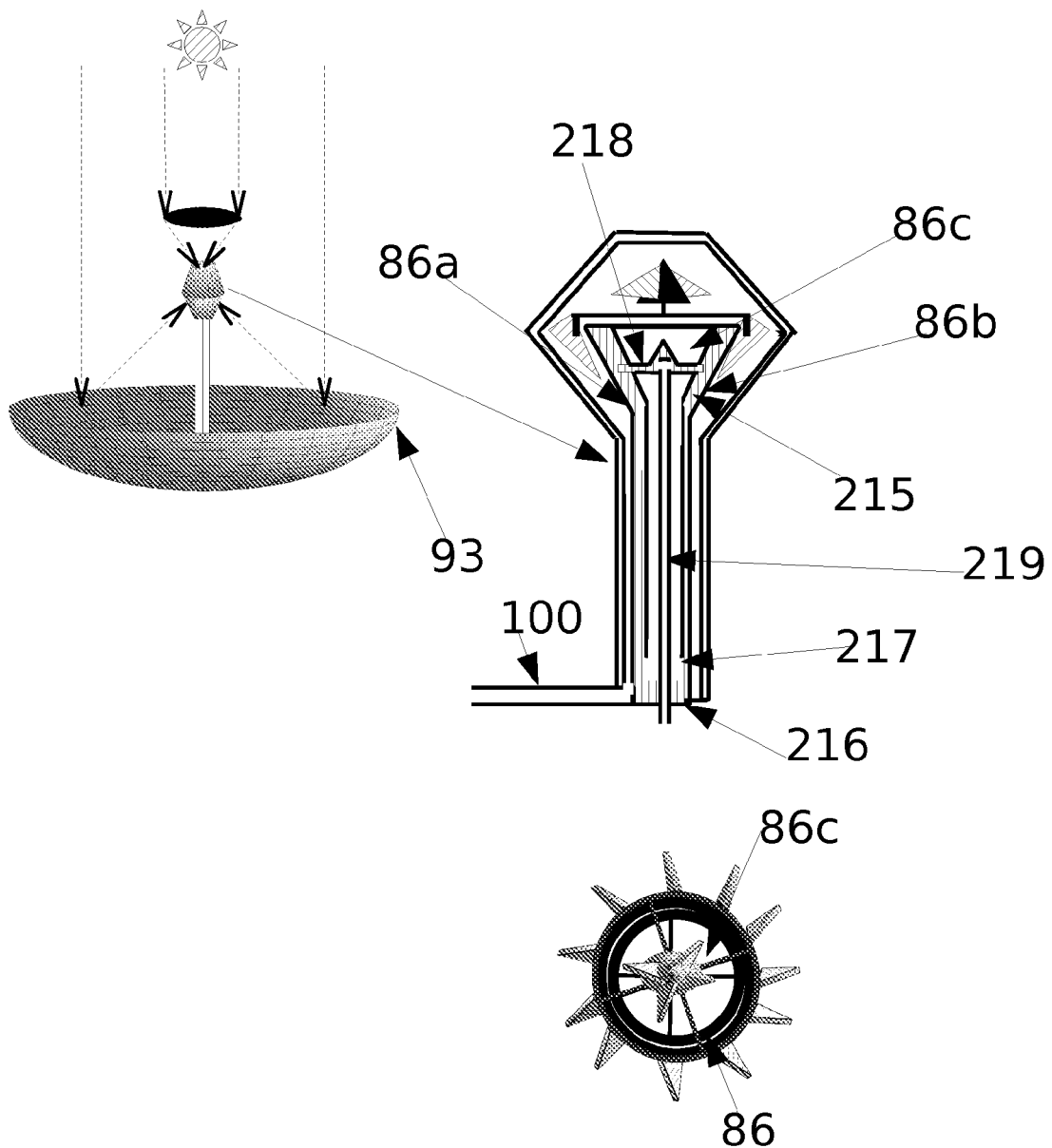
FIG. 13 is a schematic view of an embodiment showing the center pipe of the nested pipe structure.

6.4 In a yet more advantageous embodiment, the centre pipe of the nested pipe structure will optionally have a double wall FIG. 13.86a-86b comprising a beehive or foam structure consisting of cordierite or silicon carbide, arranged between the two walls FIG. 13.215. At the base of the centre pipe, the outer wall FIG. 13.216 closes the channel of the centre pipe while the inner wall has one or more openings FIG. 13.217 which enable the gases to enter and flow between the two walls of the centre pipe, through the beehive or foam structure. At the top of the centre pipe, ducts FIG. 13.218 enable gases to pass from the inter-wall space towards a gas-collecting pipe FIG. 13.219 arranged inside the channel of the centre pipe and emerging from the bottom of the centre pipe through the inner wall closing the channel of the centre pipe. In this embodiment, the gases heated by solar radiation rise up the insulating pipe 82, while actuating the blades of the rigidly interconnected rotors, which results in the gases being compressed in the channel of the centre pipe. The gases then pass into the beehive or foam structure. The gases are then further heated upon contact with the beehive or foam structure, which results in same rising into the inter-wall space of the centre pipe and the passage thereof into the collection pipe 219 arranged inside the channel 86c of the centre pipe.

6.5 In another embodiment, the nested pipe structure will form a solar-powered gas cyclone turbine enabling the air to be simultaneously accelerated and heated. The most outer portion of the solar-powered cyclone turbine will consist of a first outer pipe FIG. 15.224.

Figure 15:
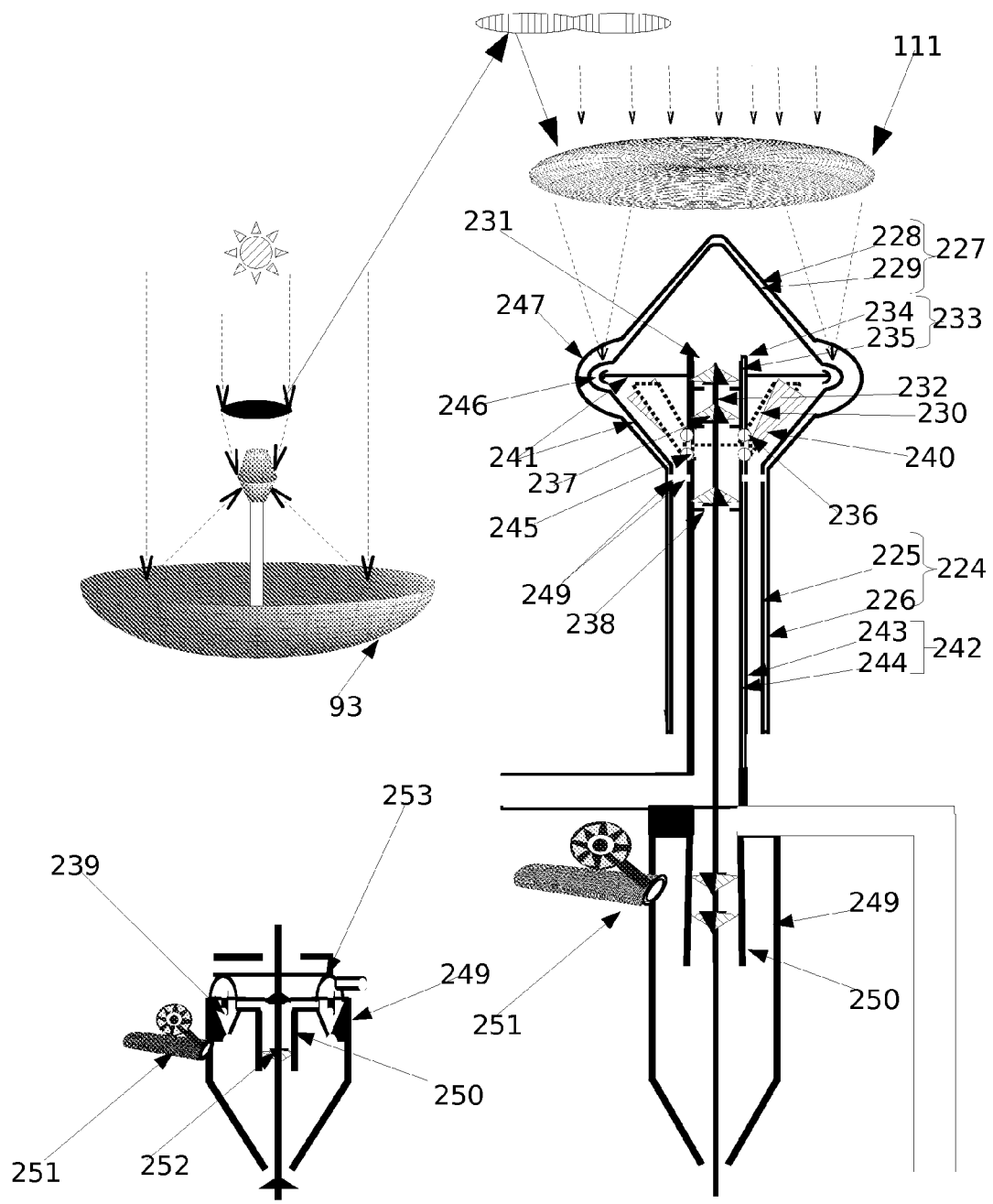
FIG. 15 is a schematic view showing sprays and/or aerosols formed by a combination of wick cyclones and the ultrasound-emitting structure.

The outer pipe is surmounted and closed by an inverted cone-shaped enclosure so as to form an inverted cyclone structure FIG. 15.227. An inverted impeller FIG. 15.230 is arranged at the inlet of the inverted cyclone, the centre portion of which is perforated with a hole FIG. 15.231. A shaft rigidly connected to the impeller FIG. 15.232 is arranged at the centre of the centre hole of the impeller and, on the one hand, extends into the first third of the cyclone, and, on the other hand, to the centre of the outer pipe. In a centre position inside the first third of the cyclone, a pipe is arranged around the shaft of the impeller, thereby comprising the shaft pipe FIG. 15.233. The impeller, at the base thereof (flared portion), bears against the shaft pipe, which will include means therein enabling the impeller to rotate, such as a ball bearing FIG. 15.236. The shaft pipe will enable the centre flow exiting the cyclone to be captured. The portion of the impeller shaft contained inside the shaft pipe will include propellers or vanes arranged as a rotor having one or more stages FIG. 15.237. Stationary vanes FIG. 15.238 are arranged on the inside face of the shaft pipe, opposite the vanes of the rotor or rotors, so as to form stators for the rotors. The shaft tube and impeller shaft plus vanes assembly thus forms a turbine, whereby, the impeller shaft, by rotating, drives the impeller. The fins arranged on the impeller FIG. 15.240 and the vanes FIG. 15.237 of the impeller shaft will be oriented in the opposite direction, so that, by rotating, the impeller fins cause the air originating with the deflector structure to enter in, while at the same time compressing said air inside the cyclone, the impeller being rotated by the action of the gases exiting the cyclone on the vanes of the central turbine of the cyclone. The impeller is shrouded in a complementary structure FIG. 15.241 connecting the outer pipe to the edge of the cyclone, on the one hand, and the edge of the cyclone to the edge of the shaft pipe, on the other hand. The top of the impeller (the narrowest portion) bears against a cyclone outlet pipe FIG. 15.242, which is arranged at the centre of the outer pipe and which surrounds the impeller shaft, so that the impeller is capable of rotating, owing to means introduced inserted said cyclone outlet pipe, such as ball bearings FIG. 5.245. Relatively U-shaped oblique ducts FIG. 15.246 are arranged at the juncture between the shroud of the impeller and the cyclone, measuring a few tens of micrometers to several centimeters in diameter. These ducts enable the gas coming from the outer pipe and compressed by the impeller to pass into the cyclone while at the same time being highly heated by the solar radiation. The orientation of the ducts will enable a swirling motion to be oriented and imparted to the gas entering the cyclone, which creates a vortex towards the top of the cone forming the cyclone FIG. 15.227. Upon arriving at the top of the cone, the gas develops into a column which will then be directed towards the shaft pipe into which it will rush while actuating the central turbine of the cyclone. The outer wall of the oblique ducts will be black (painted black, black chrome, CERMET). The oblique ducts may be made of metal but preferably of ceramic, or will have ceramic structures inside. The solar radiation originating with the deflectors (deflector or toric lens) will be directed onto the walls of the oblique ducts so as to increase the temperature thereof. The increase in temperature will be transmitted to the gas flowing inside said oblique ducts, thereby resulting in the expansion of the gas and increase in the kinetic energy thereof. These ducts act like the annular combustion chamber of a turbojet.

In certain embodiments, the walls of the oblique ducts are insulated from the outside environment, e.g., owing to an annular chamber, which is transparent over the widest possible spectrum of solar radiation FIG. 15.247. This annular chamber may be filled with an insulating gas, such as argon, xeon, nitrogen, helium, krypton or any other gas or mixture of gases. In other embodiments, this chamber will be kept under a vacuum. In order to limit the heat exchanges between the various elements of the cycloturbine, the walls of some elements will be divided in two FIG. 15.234-235-243-244, a gas acting as an insulation between the two layers of the walls. In a yet more preferred embodiment, a void is maintained between the two layers of the walls of the various elements or in the transparent annular chamber, owing to suction resulting from the flow of the fluids in the suction shafts FIG. 15.248, according to Bernouilli's principle.

The deflector will advantageously be oriented towards the sun. In a yet more advantageous embodiment, the deflector will be motor-driven so as to follow the path of the sun and offer the best light reflection output onto the solar furnace. The movement of the deflector will be pre-programmed or defined by means of photoelectric sensors, e.g., a crown of photoelectric cells or resistors arranged on the support boom of the concentrator. As the sun travels, the cell facing the sun will indicate the most luminous position, owing to the measurement of the current produced.

6.6 In a particular embodiment, heating of the air is completed by a heat exchange with the tank receiving the salts and/or particles originating with the crystallisation cyclone.

6.7 In a particular embodiment, the crystallisation cyclone is contained inside an adiabatic enclosure in which the air flows prior to being injected into the spray pump.

6.8 In a particular embodiment, the solar heat panel described in 6.2 is modified so that the heat-transfer gas flowing inside the capillaries and the insulating gas contained inside the bubbles are the same as dry or humid air, helium, argon, krypton, xeon, isopropane, tetrafluoroethane, hydrochlorofluorocarbon or a mixture of these gases, or optionally a mixture of gases derived from fermentation (methane, butane . . . ). The matrix of bubbles is created such that the gas contained in the bubbles is capable of flowing from one bubble to the other. For example, the bubbles will be structured by a 4-spot weld system for each bubble FIG. 6.199, between the two polymer sheets comprising the panel structure. The edges of both polymer sheets forming the panel are welded, leaving only the inlet ducts FIG. 6.2000 and gas outlet ducts FIG. 6.201 free, and possibly the duct to the device which enables the pressure to be controlled. One of the ends of each capillary FIG. 6.202 running to the centre of each bubble line is connected to the transverse gas outlet duct FIG. 6.203 collecting all of the gases flowing in the capillaries. The other end of each capillary remains free and open FIG. 6.204 in the first row of bubbles of the matrix. The last row of bubbles of the matrix is opposite the duct supplying the bubbles of the matrix with gas. The gas injected between the two spot-welded polymer sheets, structures the system into a bubble matrix, which, on the one hand, enables the light to be converged and reflected towards the capillaries, thereby resulting in the heating thereof, and, on the other hand, the capillaries to be insulated by a layer of gas. Upon arriving at the last line of bubbles, the gas impelled between the two polymer sheets penetrates into the capillaries where it is heated by the heat which converges on the wall of the capillaries. The gas will likewise capture the heat directly in the bubbles. The system can be declined with rigid material used conventionally in solar panels. The shape of the bubble is then defined by the structure of the materials. This flexible solar panel can be used as an insulating material for walls and buildings, while at the same time acting as a solar concentrator capturing light in every direction.

Figure 14:
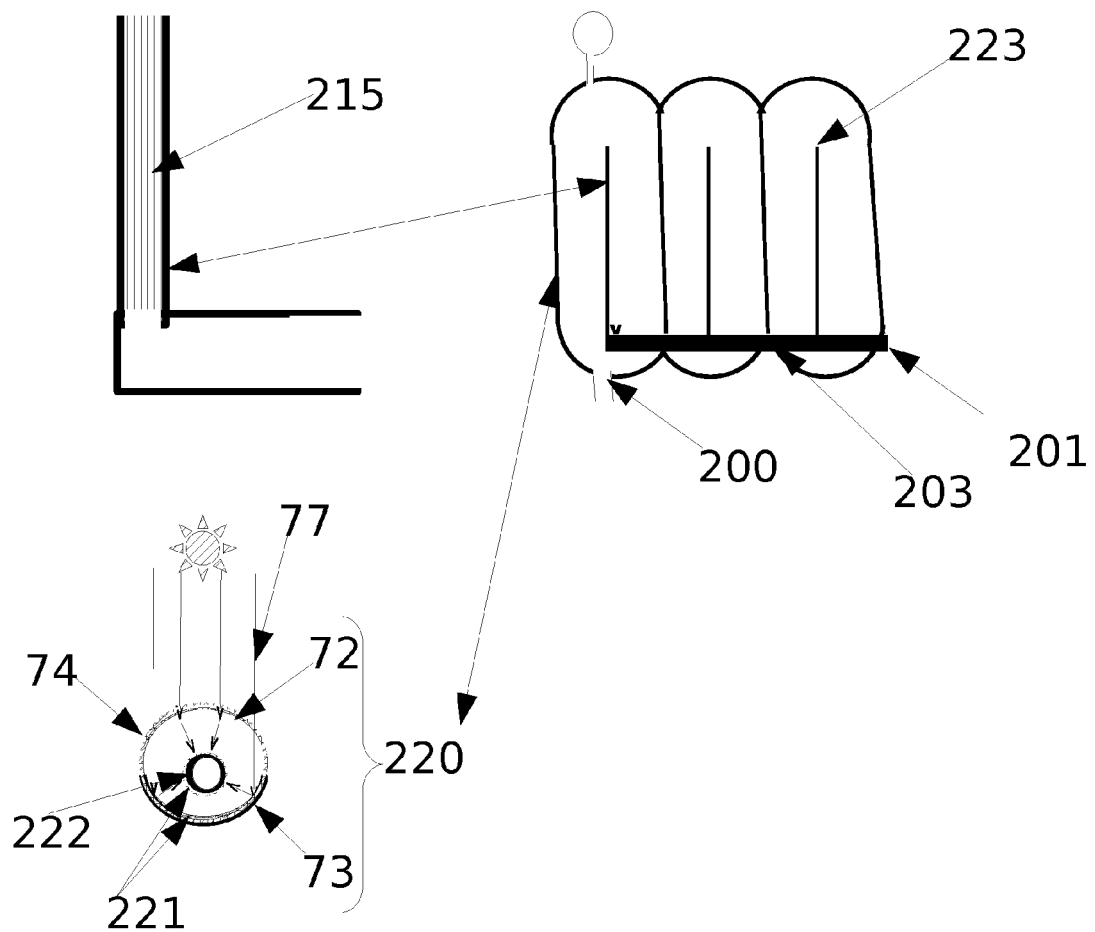
FIG. 14 is a schematic view showing how in the solar heat panel, each line of bubbles of the matrix of bubbles is replaced by one or more tubes, owing to the tube structure of the walls.

6.9 In a particular embodiment, in the solar heat panel described 6.2 and 6.8, each line of bubbles of the matrix of bubbles is replaced by one or more tubes, owing to tube structure of the walls forming the panel FIG. 14.20, so that the transparent wall FIG. 14.72 and the reflecting wall FIG. 14.73 form tubes which, at the centre thereof, comprise the capillaries FIG. 14.222 towards which the light is reflected and concentrated.

6.10 In a yet more preferable embodiment, the capillaries on which the light radiation is concentrated comprise porous beehive or foam structures in the channel thereof, which consist of cordierite or silicon carbide, ceramic or codeitrine FIG. 14.215, thereby enabling the heat exchange between the capillary walls and the gases flowing inside the capillaries to be improved.

6.11 In certain embodiments, the panels described in 6.2, 6.8 and 6.9, may comprise semi-conductive nanoparticles, either at the surface or in the wall of the membrane used as a reflector, or at the surface of the capillaries on which the solar radiation is concentrated FIG. 14.221. These nanoparticles will enable the electric current to be produced from the radiation unabsorbed or re-emitted by the capillary walls. The surface on which the semi-conductive nanoparticles will be arranged will be capable of conducting the electric current.

6.12 In one particular embodiment, the impeller shaft 232 of the cyclone turbine continues into the centre of a crystallisation cyclone FIG. 15.249 so as to pass into the tube for capturing the gases rising FIG. 15.250 from the cyclone. Said shaft emerging from the cyclone may optionally be coupled with an electric generator FIG. 16.259 which will provide a portion of the energy consumed by the system. The hot and accelerated gases coming from the shaft pipe are directed towards the spray pump inlet in order to produce a spray and vapours which will in turn be directed towards the inlet, e.g., tangential, of the crystallisation cyclone. One or more wave guides and the magnetrons thereof will optionally be arranged confluently with the cyclone inlet. Under the combined effects of the heat and electromagnetic waves, the vapour formed and the heated air form a rising column inside the crystallisation cyclone, which rushes into the tube for capturing the gases rising from the cyclone 250. One or more rotors FIG. 15.252 are arranged in the area of the impeller shaft contained inside the tube for capturing the gases rising from the cyclone 250, and have face-to-face stators arranged on the inside face of the tube for capturing the rising gases. The vanes arranged on the impeller shaft rotors, at the centre of the tube for capturing the rising gases, will have the same orientation as those of the vanes or fins of the impeller, and an opposite orientation relative to the vanes of the rotors of the shaft pipe of the solar cyclone turbine, whereby, under the effect of the gases of different directions, the shaft rotates in the same direction.

The crystallisation cyclone then acts as a gas cyclone turbine completing the solar-powered cyclone turbines in order to accelerate the air and produce electricity. This turbine offers the advantage of operating in the presence of crystallised salts and particles.

Figure 16:
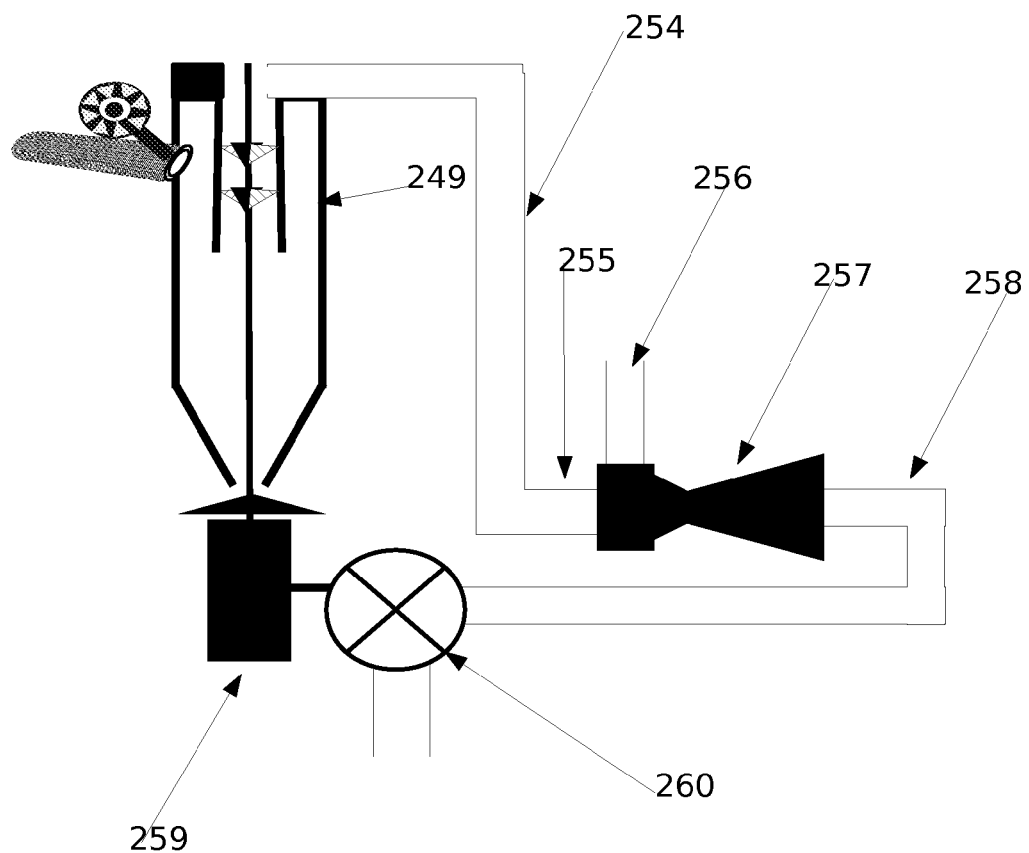
FIG. 16 is a schematic view showing the crystallization cyclone acting as a gas cyclone turbine completing the solar-powered cyclone turbines in order to accelerate the air and produce electricity.

6.13 In another embodiment, the output FIG. 16.254 of the crystallisation cyclone is sent to the primary inlet FIG. 16.255 of an ejector FIG. 16.257, the secondary inlet of the ejector being supplied with ambient air or cooled dry air. At the outlet of the ejector FIG. 16.258, the condensation of the vapours is relatively completed by a condenser and/or compressor FIG. 16.260.

7.1 The flexible solar heat panel, the furnace and the dryer can be used together or separately in solar water-heating systems in order to produce a heat-transfer fluid enabling heating by flowing inside a duct situated in a water tank.

8.1 The water vapour exiting the crystallisation cyclone can be transported over a long distance in a heat-insulated duct. If the energy (temperature) of the gas drops, it can be increased by a fan and heating system, e.g., by microwaves, thereby providing the additional energy required for transport.

8.2 In order to recover the liquid water, the water vapour produced is condensed. The water resulting from drying the air can optionally be added to the water produced.

8.3 The condenser can consist of any existing type of condenser or radiator. In a preferred embodiment, the condenser will enable heat exchange between the air originating with the dryer and the water vapour derived from the crystallisation cyclone. For example, the water vapour derived from the crystallisation cyclone FIG. 4.27 is injected at the inlet FIG. 8.113 to the condensation radiator FIG. 8.14. The radiator is inserted into a heat-insulated enclosure (radiator enclosure) FIG. 8.115. The radiator forms the septal wall of the enclosure. The radiator outlet FIG. 8.116 is connected to a water tank or pipeline for recovering liquids and/or vapours and cooled gases. Upon exiting the expansion tank of the dryer, the air FIG. 8.117 is sent into the radiator enclosure, towards the pipes and fins of the condensation radiator. The air is heated by the radiator, while at the same time cooling and/or condensing the water vapour which flows into the radiator. The airflow rate is optionally regulated inside the radiator enclosure by a fan FIG. 8.118, in order to obtain fluids (liquid/gas) exiting the radiator at a specific temperature, preferably lower than 100° C., in the case of the condensation of water, and, yet more preferably, at a temperature within a range between 96 and 78° C., for example, for separating an additive (ethanol) and water. After the radiator enclosure, the air is conveyed either towards other heating systems, or towards the spray pump.

8.4 In certain embodiments, a system of solenoid valves enables the airflow direction and pattern to be defined between the various elements of the system, on the basis of the temperature gradients which, for example, vary relative to solar radiation.

Figure 8:
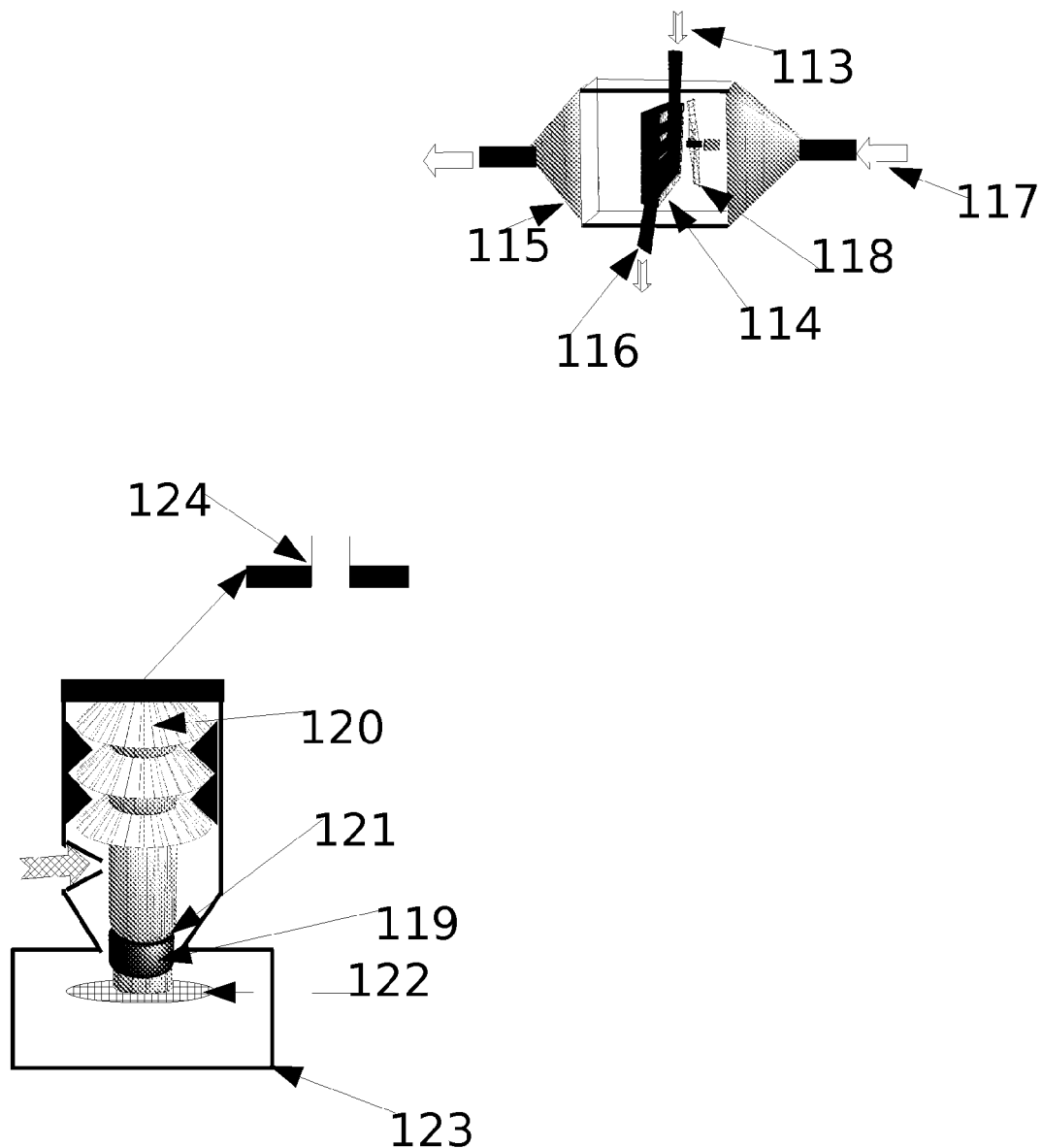
FIG. 8 is a schematic view showing how to condense and recover the water vapor produced, and how a distillation column is arranged for collecting the fluid (vapor/gas/liquid) coming from the condensation radiator.

8.5 Upon exiting the condensation radiator FIG. 8.116, the condensed water vapour is optionally stored in a tank. This tank is preferably included in another (outer) tank surrounding same and containing water to be distilled or purified, so as to heat said water by recovering the heat of the distilled water. If the outer tank is in the open air, it will preferably be black or dark in colour, for maximum heating from a solar standpoint. In some cases, the water from the outer tank will be drinking water intended for reheating via heat exchange with the freshly distilled water.

8.6 In certain embodiments, the outer tank, containing the condensed water vapour recovery tank, is filled with an additive such as alcohol. The hotter condensed water coming from the radiator is cooled by transferring the heat thereof to the additive, the temperature of which rises. In certain embodiments, the nesting of the tanks can be inverted.

9.1 An additive, preferably ethanol, can be mixed with the water being purified or desalinated, in a proportion of additive of between 0.1% and 90%, so as to reduce the energy required for an aerosol product or spray and to evaporate the water. The additive, for example, can be mixed with the water being treated, during the pumping phase FIG. 9.54.

10.1 In the case of using an additive to improve the system performance, the additive is separated from the water, e.g., during the condensation phase or after the water has been condensed.

10.2 In a particular embodiment, a distillation column is arranged above the tank collecting the fluid (vapour/gas/liquid) coming from the condensation radiator. The fluid exiting the radiator is at a temperature higher than or equal to the boiling temperature of the additive. The distillation column enables the water falling into the tank to be condensed and the alcohol vapours to pass into the alcohol tank.

10.3 In a preferred embodiment, the distillation column will consist of a cylinder provided with a staggered plate structure at the centre thereof, which is connected to the cold pole of one or more Peltier elements; the hot pole of the element or elements being situated at the top of the column, thereby comprising a structure similar to the device described in 5.5. Alternatively, the Peltier element FIG. 8.119 is situated beneath the plate structure FIG. 8.120 connected to the cold pole of the Peltier element FIG. 8.121. The hot pole of the element is connected to the radiator FIG. 8.122 situated inside the tank FIG. 8.123 collecting the liquid which falls down from the column. The plates will advantageously be oriented downward. The Peltier element is controlled such that the plates are cooled to a temperature which enables the water to condense but not the additive. For an additive such as alcohol, the preferred temperature will be between 100° C. and 80° C. The top of the column is connected to an alcohol tank FIG. 8.124. In certain embodiments, the juncture between column and the tank consists of a serpentine pipe contained inside a tank cooled by the alcohol pumped into the alcohol tank or by another fluid to be heated (water to be purified, domestic supply water, air prior to injection into the spray pump).

11.1 In another embodiment, in order to treat dirty water including elements having a boiling temperature higher than and/or lower than that of water, two consecutive distillation operations at a fixed temperature can be carried out, in order to separate the water from the other compounds. A first distillation operation at a temperature of between 110 and 90° C., preferably at 101° C., and a second distillation operation at a temperature of between 99.9° C. and 80° C., preferably at 97° C. However, the separation of the water from the other compounds can be carried out via a single distillation operation, in a distillation column having a decreasing temperature gradient of between 150° C. and 70° C., for example. The water will be recovered within temperature ranges of between 90° C. and 100° C. The other distillation products from the dirty water or salt water will be broken down and recovered relatively pure (depending on the performance of the distillation column) within the desired temperature ranges.

11.2 The first distillation operation, at a temperature of between 110° C. and 90° C., can be obtained using the devices described in 8.3 and 10.2-3. However, the condensation radiator will be maintained at a preferred temperature higher than 100° C., and more preferentially equal to 105° C., and the distillation column will be maintained at a temperature of between 110° C. and 90° C., and more preferentially 101° C.

11.3 In a particular embodiment, the distillation operation is carried out owing to a system of nested columns and Peltier elements used as heating and cooling sources. The system includes an inner distillation column FIG. 9.125 consisting of a tube with a cross-section of any geometric shape (made of glass, metal or a refractory material). The tube, which preferably has a cylindrical cross-section FIG. 9.126, will be perforated with regular holes FIG. 9.127. For example the holes will be arranged along a generatrix of the cylinder. In a preferred embodiment, the holes will be arranged as an ellipsis, according to a chosen rotation and translational movement FIG. 9.128. In the area of each hole, inside the cylinder, a plate FIG. 9.129 (cooling plate) is connected to the upper bore of the hole, and is preferably angled upwardly at between 91° and 179°, preferably at 100°. The plate, for example, will consist of a non-stick metal sheet (steel, aluminium, . . . ) or will optionally be coated with a non-stick material, such as polytetrafluoroethylene (PTFE) or perfluoroalkoxy (PFA). The metal sheet is cooled by a cold source, e.g., the metal sheet is in contact FIG. 9.130 with the face of a Peltier element FIG. 9.131 maintained at a temperature lower than the condensation temperature of the vapours being condensed (cold face). In certain embodiments, the Peltier elements can be arranged in the wall of the tube and, in other embodiments, adjacent to the wall, on the inner or outer face of the tube. The inside or entire wall of the tube will preferably be made of a heat-insulating material (double-glazed glass separated by a void, ceramic, plastic material, silicone).

Figure 9:
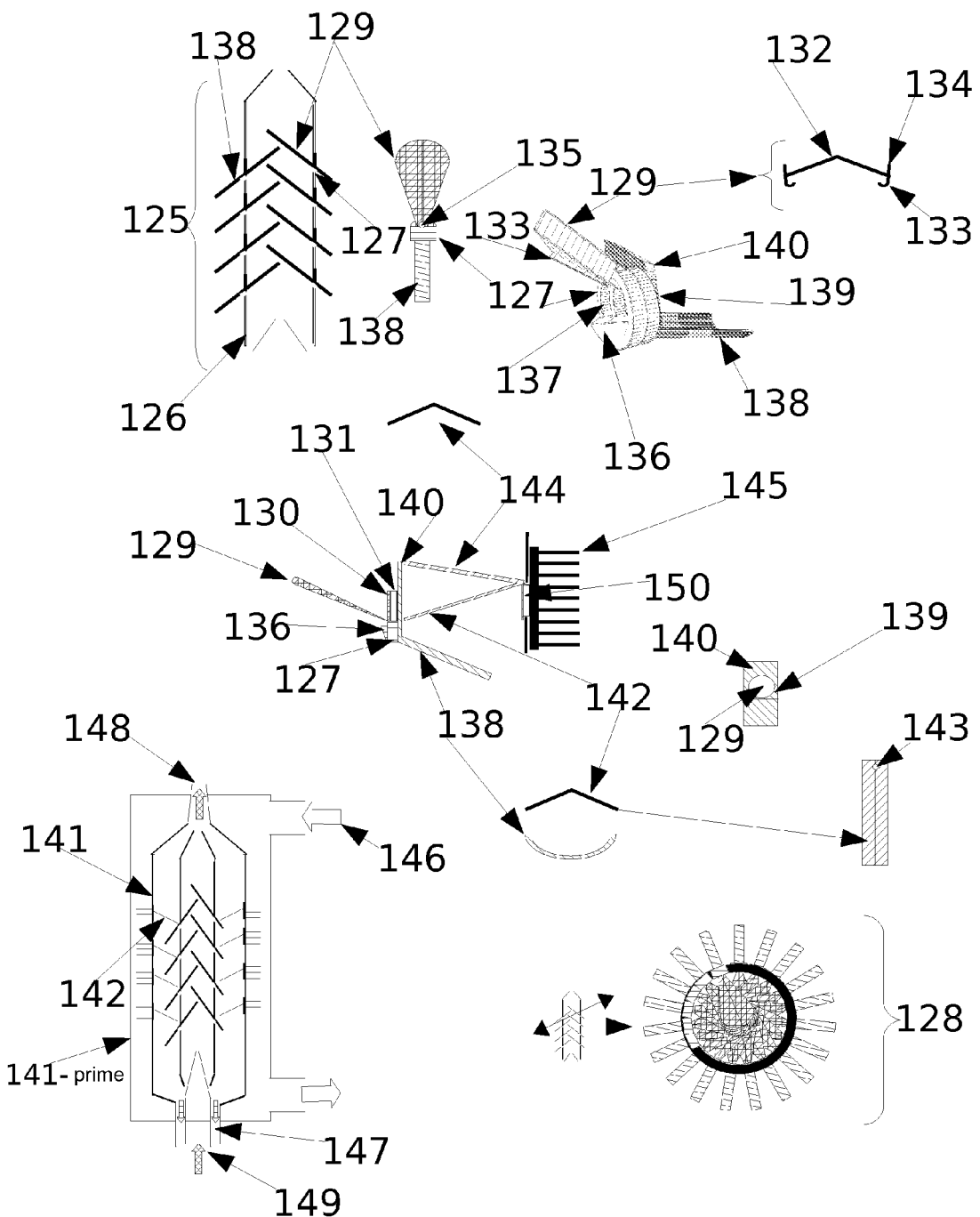
FIG. 9 is a schematic view showing how the distillation operation can be carried out owing to a system of nested columns and Peltier elements used as heating and cooling sources, the system including an inner distillation column.

The edges of a plate may optionally be curved upwardly or preferably downwardly FIG. 9.132 and they may optionally have troughs FIG. 9.133 for collecting and conveying the condensed liquids on the lower surface of the plate towards the hole. The edges of the plate may likewise comprise upwardly pointed rims FIG. 9.134, which enable the liquids dropping onto the plate to be conveyed towards the hole. In the latter embodiment, one or two pores FIG. 9.135 drilled near the area where the plate is attached enable the water to pass from the upper surface of the plate towards the hole FIG. 9.127. In certain embodiments, the lower and/or upper surface of a plate will comprise striations for guiding the flow of the condensed liquid towards the troughs, edges or the hole. The two troughs of the edge of a plate terminate at the rim of a hole FIG. 9.136, thereby enabling the condensed liquids on the plate to be collected in the hole. The pores passing through the plate are situated after said rim.

The lower wall of the hole situated after the edge or hole itself is preferably angled, at an angle having the same orientation as that of the plate. The inside wall of the hole FIG. 9.137 is covered with a heat-insulating material (plastic, ceramic, glass, silicone, . . . ), thereby enabling a gap in temperature to be achieved between the plate and the hole. In certain embodiments, the plate can be replaced by a metal needle or grillwork.

11.4 A second structure (heating structure) is arranged against each hole on the outer face of the tube, outside the inner tube and in line with the interior cooling plates (between 100° and 180° relative to vertical). This may consist of a single or branched needle structure or grillwork, but preferably a plate the edges of which are angled downwardly or advantageously upwardly FIG. 9.138, in order to form a trough. This structure will be rigidly connected to the upper edge or preferably lower edge of the hole FIG. 9.139, in order to collect the flow coming from the inner cooling plate FIG. 9.129 on the lower or upper face thereof, respectively. The plate or structure (heating plate) will be brought to a temperature higher than or equal to the boiling temperature of the condensed vapours, while being connected FIG. 9.140, for example, to a heating element, preferably the second face of the Peltier elements FIG. 9.131 used, for example, for the inner cooling plates. In certain embodiments, the Peltier elements will preferably be thermally insulated from the surface of the tube. However, when the inner tube is metallic or heat-conducting, the elements may be conjoined on the outside of the inner tube or preferably on the inside of the inner tube. In the latter two conditions, the inside and optionally the outside of the inner tube will be entirely or partially heat-insulated, so as to carry out the heat and cold transfers primarily by means of the plates. In certain embodiments, only small surface areas of the outer face of the inner tube, which are situated above the plate systems, remain free.

In certain embodiments, the heating plate or structure will be filled or covered with porous elements (sand, crystals, frit, pumice stone) enabling evaporation to be promoted.

11.5 The active distillation column, comprising the heating and cooling plates described in sections 11.3 and 11.4, is contained in a larger-diameter tube (outer cylinder) FIG. 9.141 made of metal, glass, ceramic, a plastic material or a refractory material, comprising cooling plates FIG. 9.142 (outer plates). Each outer plate, made of non-stick metal or optionally coated with a non-stick coating, departs from the wall of the outer cylinder so as to be situated above a heating plate, either parallel FIG. 9.138 or non-parallel FIG. 9.142 thereto. In certain embodiments, the non-parallel plates will be perforated with a pore FIG. 9.143 at the base of the attachment of the plate to the outer cylinder. The pore enables the rising vapours to pass over the inner face of the outer plate. In a preferred embodiment, the non-parallel plates are extended, starting from the wall of the outer tube, by a plate FIG. 9.144 which is relatively parallel to the heating plate FIG. 9.138. The parallel plates are preferably pointed towards the outer wall of the inside distillation tube FIG. 9.126, and arrive in proximity to the wall of said inside tube without reaching same. The outside plates may optionally be connected to radiators, made of metal, for example, FIG. 9.145, and which are situated on the outer face of the outer cylinder, thereby enabling the temperature of the plates to be regulated. The entire device can be placed inside a cooling tube FIG. 9.141-prime, wherein air flows FIG. 9.146 at a specific temperature and specific velocity, e.g., owing to a fan, so as to maintain the outer plates at the desired temperatures.

The cooling air can advantageously come from the spray pump air system. The temperatures of the entire system are advantageously controlled by temperature sensors arranged on the various plates which define the currents and voltages powering the Peltier elements as well as the fan speed, so as to control the temperature of the system interactively, owing to electronic boards.

11.6 Ventilation of the condensation radiator enclosure FIG. 8.118 is regulated, for example, so that the vapours exiting the condensation radiator, condensed or uncondensed, have temperatures of between 120° C. and 100° C. A convergent/divergent system can optionally be inserted after the radiator, in order to bring the vapour temperature close to 100° C. Upon arriving FIG. 9.149 on the cooling plates FIG. 9.129 of the active distillation column described in section 11.3, which is maintained at 95° C., for example, the water vapours are condensed, as well as a portion of the additive vapours, such as ethanol. The additive-enriched vapours continue to rise in the column in order to react with the following plates according to the same principle. The water and a portion of the additives condensed on the cooling plate slide over same through the hole FIG. 127, into the outer tube, and towards the heating plate FIG. 38, which, for example, is maintained at 98° C. Under the effect of the heat, a portion of the water evaporates, as well as the greater portion of the additives that have passed into the outer tube. The non-evaporated and purified water drips into the bottom of the tube where it is recovered in a water tank via an outlet FIG. 9.147. The vapours formed on the heating plate rise and come into contact with the non-parallel upper plate FIG. 9.142, which is maintained at a temperature lower than 95° C., for example. The water then condenses and once again flows over the heating plate in consecutive purification cycles, prior to dripping to the bottom of the tube. The additive vapours produced on the heating plate rise along the non-parallel plate up to the pore FIG. 9.143 situated close to the attachment base of the non-parallel plate to the outer duct. The vapours pass through said pore to continue the ascension thereof beneath the inner face of the contiguous, parallel outer plate FIG. 9.144. The parallel outer face then conveys the vapours within proximity to the outer wall of the inner distillation cylinder. In the absence of a non-parallel plate, the vapours coming from the heating plate condense directly on the parallel plates, and the condensate flows along the parallel plate towards the inner wall of the outer tube and then towards the bottom of the tube, while the uncondensed vapours rise over the lower face of the parallel plates towards the outer wall of the inner tube. In certain embodiments, a hot body FIG. 9.140, at 98° C., for example, is arranged on the outer face of the inner tube, opposite the end of the parallel plate FIG. 9.144. This may consist of the wall of the tube which is not heat-insulated and which is heated by the Peltier elements. The hot body heats the vapours, thereby resulting in the ascension thereof towards the top of the outer tube. At the top of the inner tube and outer tube FIG. 9.148, the additive-enriched uncondensed vapours are conveyed into another condensation system set at a lower temperature suitable for condensation of the additive, e.g., lower than 78.5° C. for alcohol.

In a particular embodiment, Peltier elements FIG. 9.150 are implanted on or in the walls of the outer cylinder, so that one face of the element is connected to the parallel and/or non-parallel plates FIG. 9.142-144 of the outer tube and the other face is connected to the radiators FIG. 9.145 situated on the outer tube, so that there is a temperature difference between the two faces of the element. This connection can be made via the wall of the outer tube when same is heat-conductive. As a result of the difference in temperature between the faces of the Peltier element, an electric current is produced by said element. The electric current will either be used directly in the system or stored in current accumulators (battery, cell . . . ). Generally speaking, Peltier elements may be used at all the system interfaces having significant temperature differences, in particular in the cooling radiators and fans.

12.1 The distillation columns can be adapted to produce the air dryer, just as the systems described in 5.2-5 may be adapted to be condensation systems. A combination of these systems can likewise be used. The temperatures will be adapted to the use of the device and to the type of vapour involved in the condensation process.

12.2 Generally speaking, the temperatures are indicated for operation at standard atmosphere. In actual operation, they will have to be adapted to the pressures of the various compartments of the method.

12.3 Generally speaking, the vapours produced, and the vapours present in the atmosphere, may be condensed by active condensation systems enabling the water to be separated from the other compounds and including heating and cooling elements such as Peltier elements, and ventilation systems recovering the heat produced by the electric fan motors.

13.1 The method may be applied to the purification of septic tank water and more generally to wastewater purification methods.

13.2 In a particular embodiment, the method will be used to purify wastewater from a septic tank, or from treatment plants, after same has been filtered through a mechanical system such as an endless screw press, a centrifuge, a belt filter, plate filter, rotary ring press, or any system enabling aggregation of materials suspended in water.

Figure 10:
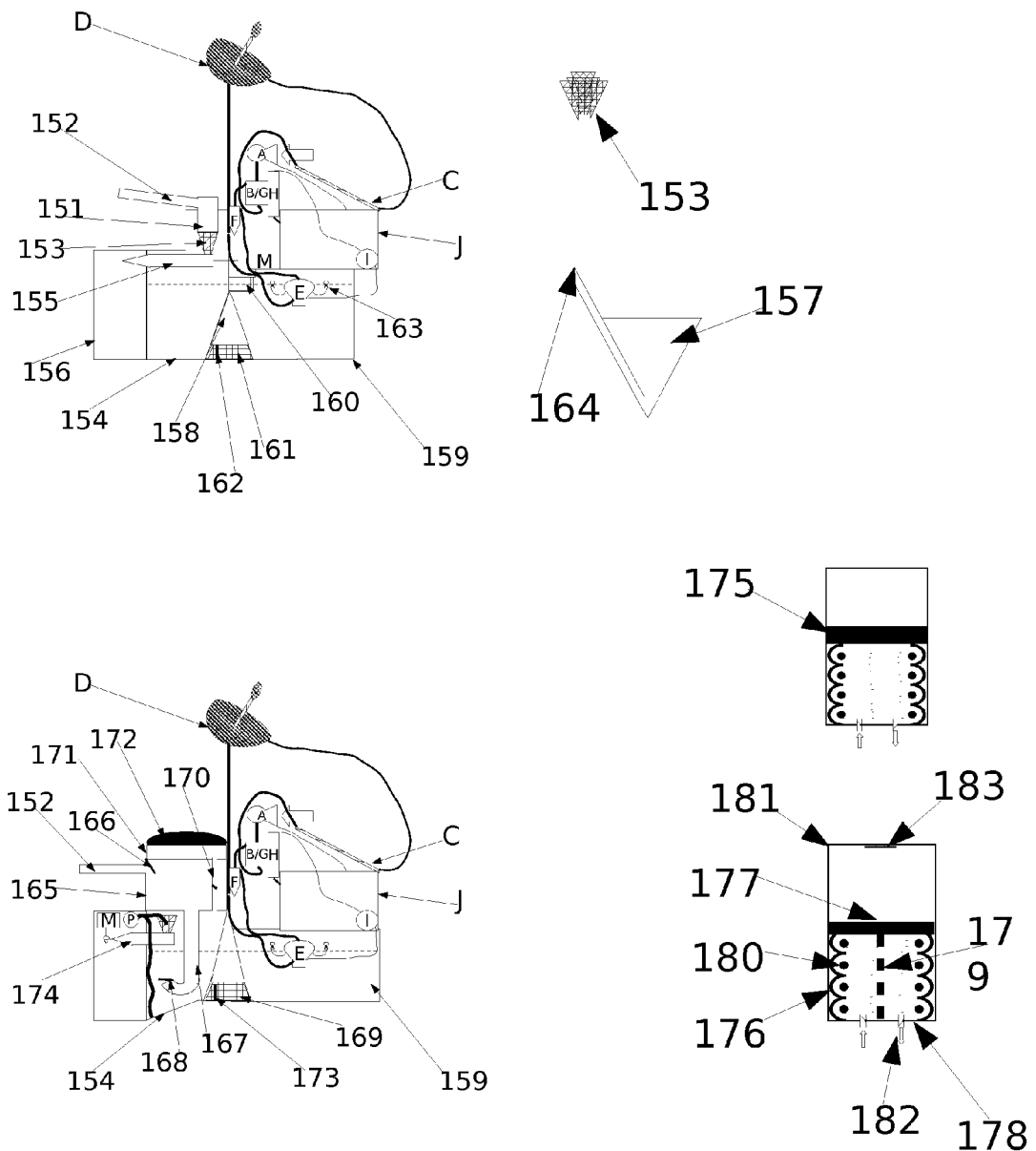
FIG. 10 is a schematic view showing how to purify wastewater from a septic tank, after the water has been filtered through a mechanical system such as an endless screw press.

13.3 In a yet more particular embodiment, the septic tank or treatment plant will include a receiving compartment FIG. 10.151 which will receive the wastewater arriving via a collector FIG. 10.152. Said wastewater may likewise contain ground material from garbage grinders. The particles of the mixture are filtered, for example, in a small-mesh sieve FIG. 10.153 at the outlet of the receiving compartment. The filter preferably consists of a series of nested sieves of increasingly smaller mesh FIG. 10.153. The filtrate is discarded into the sludge compartment FIG. 10.154 situated beneath the receiving compartment. The sieve or sieves will preferably be of an inverted cone shape and will have a hole at the end of the cone which enables passage of the sludge that has formed. After sieving, the sludge is directed towards an active filtering system such as an endless screw press FIG. 10.155, a centrifuge, belt filters, plate filters, a rotary ring press, or a combination of several of these systems. The filter cake consisting of the pressed sludge, for example, will be directed towards a third enclosure (filter cake compartment) FIG. 10.156, while the filtration water, for example, will be emptied into the sludge compartment.

The unsieved suspended particles are then decanted into the sludge compartment FIG. 10.154 where they settle to the bottom of said compartment. Said particles are optionally sucked from the bottom of the sludge compartment by a pump system, towards the press system. Generally speaking, any type of system enabling the settled matter to be suctioned can be used.

Surface suction will enable the floating particles to be directed to the surface of the liquid in the sludge compartment, towards the sieves and/or active press system.

The sludge compartment will be separated by an incomplete partition FIG. 10.158, from a fourth compartment (clear water) FIG. 10.159. The top of the partition will comprise filters FIG. 10.160 consisting of synthetic foams, sand and gravel, pumice stone, metal filters, etc. The water will pass from the sludge compartment to the clear water compartment by overflowing the gravel/sand/sponge filters. In certain embodiments, the bottom of the incomplete partition FIG. 10.158 will comprise filters FIG. 10.161 such as beehive frits, for example, made of cordierite, silicon carbide, titanium or other metals, a synthetic polymer or any other material enabling the water to pass through and the particles having a size preferably larger than 0.1 micrometer to pass through. Filtering of the water through the frits is ensured by the pressure difference resulting from the liquid level difference between the sludge compartment and the clear water compartment. In order to clean the filter and increase the filtration efficiency, the frit is connected to an ultrasound source FIG. 10.162. The filtering system may be completed by sand/gravel systems situated before and/or after the filter. The filtered water from the clear water compartment is introduced into a spray pump FIG. 10.E by pumping or gravity (siphoning) FIG. 10.163, so as to be transformed into an aerosol and evaporated in a previously described evaporation cycle (FIG. 10.A-B-C-D-E-F-G-H-I).

13.4 In certain embodiments, the dry and hot air exiting the dryer is injected through the filter cake compartment so as to dry the filter cake of pressed particles, which is discharged therein.

13.5 The pressed particle filter cake will subsequently be recovered and used as fuel in various processes and, in particular, to manufacture biomass granules combined with other products such as sawdust, household garbage or waste paper. Said granules will be used for fuel production in the production of energy or hydrocarbon fuel, for example.

14.1 In a preferred embodiment, the compartment receiving the wastewater (receiver) FIG. 10.165 may be hermetically sealed. For example, a solenoid valve, gate, valve or check valve FIG. 10.166 or a pressure gate positioned by the collector will enable the duct to be closed and/or prevent back-flow therein. The sludge compartment will be connected to the receiving compartment by a duct FIG. 10.167 which preferably terminates near the bottom of the sludge compartment. In this way, the opening to the duct is quickly found beneath the surface of the liquid flowing from the receiver FIG. 10.165 to the sludge compartment. The duct opening will preferably be pointed upwardly so as to enable a maximum depth when the wastewater flows into the sludge compartment. The duct, for example, may be closed by a check valve, thereby enabling the flow when the pressure inside the receiving compartment is higher than or equal to that in the sludge compartment, while preventing any back-flow. In other embodiments, the duct maybe closed by a solenoid valve FIG. 10.168 (receiver outlet valve). A pump may optionally be arranged inside the duct in order to facilitate the forward movement of the liquids and suspended matter. The sludge compartment is connected to a third clear water compartment FIG. 10.159 via one or more ducts or openings sealed by filters FIG. 10.169 enabling the water to be filtered or pre-filtered, such as sintered structures, ceramic filters, sponges, ultrafiltration membranes, filtration membranes, sand and gravel sieves, pumice stone, and generally speaking any structure enabling filtration or ultrafiltration.

In a particular embodiment, the filters consist of an ultrafiltration membrane between two sintered structures, the entire assembly being arranged inside a gravel and sand compartment. This configuration makes it possible to prevent any tearing of the membrane. The water which flows out of the sludge compartment towards the clear water compartment is filtered through the filter systems. The water from the clear water compartment is then introduced into a spray pump by pumping or gravity, so as to be transformed into an aerosol and evaporated in a previously described evaporation cycle (FIG. 10.A-B-C-D-E-F-G-H-I).

When the water level in the receiver is sufficient to counterbalance the pressure of the sludge compartment, the valve FIG. 10.168 opens automatically. The wastewater then flows towards the sludge compartment. The outlet valve of the receiving compartment is closed or recloses as soon as the difference in pressure between the two compartments becomes greater in the sludge compartment. In the sludge compartment, the wastewater then undergoes anaerobic fermentation, e.g., by methanisation or butyrisation. The release of the fermentation gases, which causes the pressure in the pressure chamber to increase considerably, results in the water from the sludge compartment being filtered towards the clear water compartment, through the system of filters FIG. 10.169 connecting same, under the effect of the pressure of the gasification gases released by the fermentation of the suspended organic compounds in the water. Under certain conditions, a mixing mechanism enables the medium to be agitated in order to promote fermentation. To prevent the pressure from increasing beyond the anticipated limits in the pressurised compartment, the latter is connected, via a duct FIG. 10.170 provided, for example, with a check valve, pressure valve, solenoid valve, etc., to a pressure pad enclosure FIG. 10.171, at least one of the partitions of which consists of an elastic membrane with a calibrated extension stiffness constant k FIG. 10.172 enabling the increase in pressure to be attenuated. When the pressure increases beyond the force delivered by the membrane, the membrane expands, thereby enabling the pressure to be reduced. The same result is obtained with an enclosure, e.g., a cylinder, the upper wall of which consists of a movable piston FIG. 10.175 of a given mass enabling a constant pressure to be maintained, while the gas strikes the piston to achieve equilibrium between the mass of the piston and the pressure of the gas. In certain devices, the pressure pad system consists of membranes ballasted or lined with springs.

Nevertheless, a certain amount of gas dissolved in the filtration water can pass into the clear water compartment, tending to increase the pressure of said compartment as soon as the dissolved gases pass into the vapour phase. In certain embodiments, in order to limit passage of the dissolved gases, the filters are connected to an ultrasound source FIG. 10.173 and/or an ultrasound source is positioned immediately before the filters. In addition to increasing the filtration speed, this enables the water in the sludge compartment to be degassed before or at the moment when the water passes through the filter.

14.2 In certain embodiments, in order to maintain the desired difference in pressure between the two sludge and clear water compartments, a pump transfers the atmosphere from the clear water compartment to the pressure compartment, or, in a preferred embodiment, towards a second extensible or movable membrane compartment with a lower stiffness constant k for the elastic wall than that of the first pressure pad compartment. When fermentation no longer progresses (measured, for example, by the increase in volume of the buffer compartments), the valve connecting the sludge compartment to the buffer enclosure is closed. The water and sludge from the sludge compartment is then pumped. For example, the sludge is pumped by a peristaltic pump FIG. 10.P (or any other type of pump), and then the sludge is filtered and pressed by an endless screw press FIG. 10.174, centrifugal, belt filter, plate filter or rotary ring press system, or a combination of several of these press systems. The resulting particle filter cake is discarded into a filter cake compartment, while the filtration water is discharged into the sludge or optionally clear water compartment. The outlet valve FIG. 10.168 of the receiver is then opened, thereby enabling the wastewater to enter the sludge compartment so that the new filtration cycle begins.

14.3 In other embodiments, passage of the sludge and wastewater between the receiver and the pressure chamber is ensured by a preferably peristaltic pump.

15.1 In certain embodiments, the pressure pad system consists of elastic-walled balloons contained inside a protective container. In other embodiments, in order to prevent porosity problems due to the elastic membranes, the pressure pad system consists of a sleeve, preferably made of a synthetic material impermeable to methane and butane, which is non-elastic or slightly elastic but flexible and preferably of a cylindrical shape FIG. 10.176. The ends of the sleeve are closed by rigid elements FIG. 10.177-178 so as to form a bellows. The two rigid elements closing the sleeve are interconnected by a spring or elastic belt FIG. 14.179 (return element), having a stiffness constant k defined such that, at the given elongation of the sleeve, the return force of the return element and the weight of the piston compensate for the pressure of the gas. In certain embodiments, the flexible material of the sleeve is reinforced by a spring structure FIG. 10.180 enabling the opening in the sleeve to be left always open and the gradual bellows-like deployment based on the increase in pressure. In certain embodiments, the bellows is contained in a preferably cylindrical rigid container FIG. 10.181. Among other things, this container enables gas pressures to be obtained, which are higher than the pressure compensating for the force corresponding to the maximum elongation of the return system (increase in pressure without increase in volume). One of the faces of the container is rigidly connected to the rigid element FIG. 10.178 closing the sleeve, likewise corresponding to the face through which the sleeve is supplied with gas FIG. 10.182. In certain embodiments, a connector FIG. 10.83 is arranged at the other face of the container, opposite the attachment face of the sleeve, which will be activated when the bellows bears with a specific degree of force against a pressure sensor (spring with a calibrated stiffness constant k, quartz scale . . . ) situated on said face of the container, thereby causing the closing or opening of solenoid valves according to desired kinematics. As the pressure increases in the sleeve, the return device stretches so as to compensate for the pressure force. Reaching the end of travel, the movable face of the sleeve triggers a connector situated at the end of the container, at a predetermined pressure.

The variable-volume enclosures described above enable the gas pressure to be controlled irrespective of the physical variations in the gas. They can be used to provide a stable pressure for a gas contained in a container and having to expand and flow in expansion systems, irrespective of the gas molarity remaining in the gas container.

Figure 11:
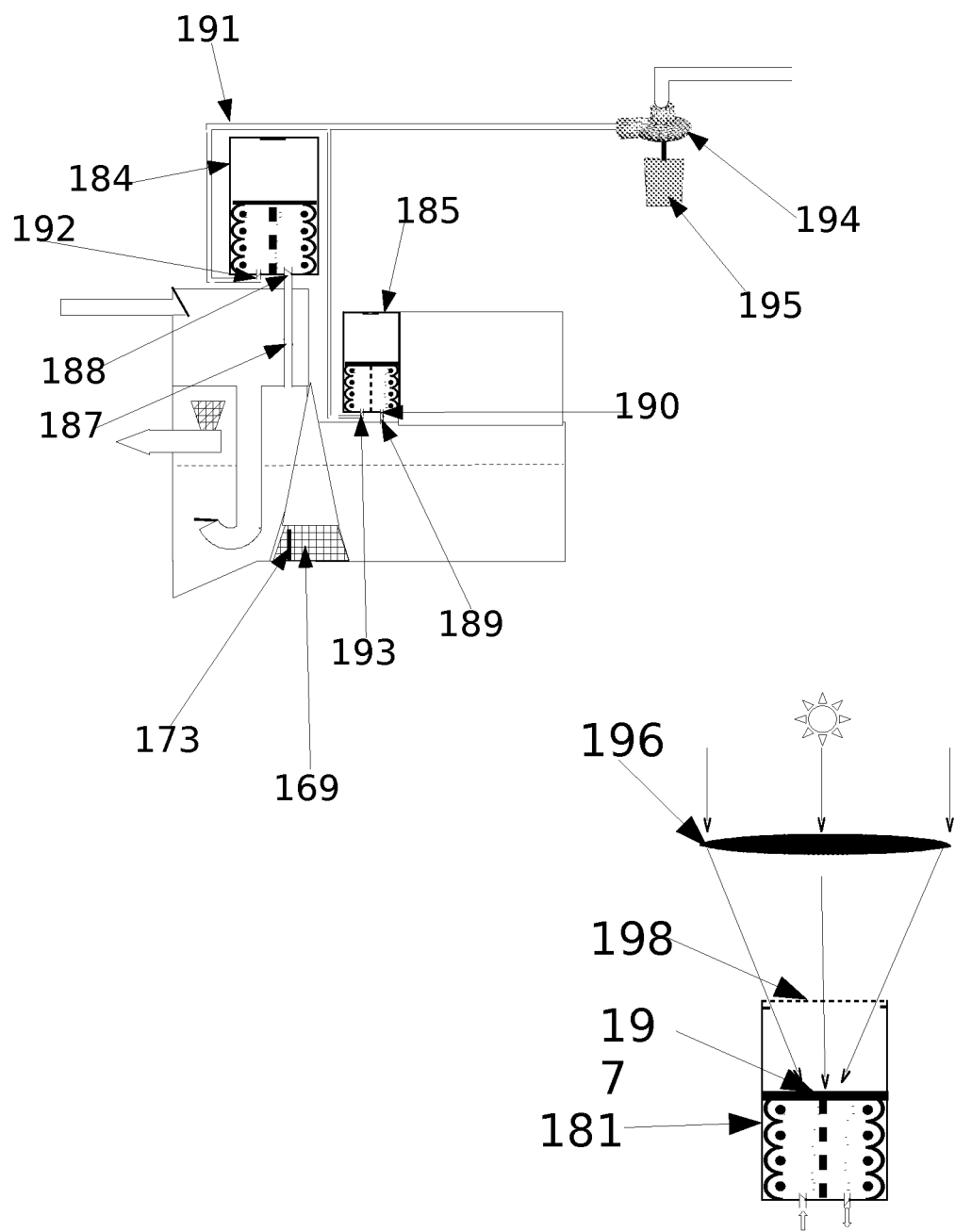
FIG. 11 is a schematic view showing how variable-volume enclosures allow the gas pressure to be controlled irrespective of the physical variations in the gas.

15.2 In a particular embodiment, the pressure pad chamber system consists of two enclosures with stiffness constants k for the return system such that the return constant K1 of the buffer chamber FIG. 11.184 connected to the sludge compartment is greater than the return constant K2 of the buffer chamber FIG. 11.185 connected to the clear water chamber. The buffer chamber FIG. 11.184 is connected to the sludge chamber via a rigid duct FIG. 11.187 comprising a solenoid valve, a pressure valve or check gate, valve or flap FIG. 11.88. In the same way, the buffer chamber FIG. 11.185 is connected to the clear water chamber via a rigid duct FIG. 11.189 comprising a solenoid valve, pressure valve or a check gate, valve or flap FIG. 11.90. The two buffer pressure chambers are connected by a rigid transverse duct FIG. 11.191, the buffer chambers being separated from the transverse duct by solenoid valves FIG. 11.192 and FIG. 11.193 or pressure valves the opening of which is calibrated for a given pressure (e.g., the pressure corresponding to the pressure exerted by a specific elongation of the return system). In certain embodiments, the transverse duct is continued and is connected to a turbine FIG. 11.194 or compressed air motor coupled to an alternator or current generator FIG. 11.195. During the methanisation phase, the solenoid valves FIG. 11.188-190 are opened (under the effect of the difference in pressure for the check valves). The solenoid valves FIG. 11.192 and FIG. 11.193 are optionally closed. The methanisation gases flow out of the sludge compartment towards the buffer chamber FIG. 11.184, thereby turning on the return system, compensating for the gas pressure. Degassing FIG. 11.173 of the dissolved gases in the clear water compartment results in the outflow of a certain amount of gas towards the buffer compartment FIG. 11.185, thereby turning on the return system, compensating for the gas pressure. Since the constant K1 is larger than the constant K2, the pressure in the sludge compartment remains higher than in the clear water chamber, thereby promoting filtration of the water through the filter FIG. 11.169.

At the end of the methanisation phase:

If the maximum (or desired) volumes or pressures of the buffer pressure enclosures FIG. 11.184 and FIG. 11.85 are achieved, the valves FIG. 11.192 and FIG. 11.193 are opened, and, under the effect of the pressure and return systems, the gas contained in the buffer chambers then flows towards the turbine FIG. 11.194 or compressed air motor, causing same to rotate, and thereby drives the coupled alternator FIG. 11.195, which produces an electric current. The electric current, for example, will be accumulated in an electrical current accumulator (battery) or used directly to supply the various devices of the system with an electrical current.

15.3 In a preferred embodiment, the use of pressure valves for valves FIG. 11.192 and FIG. 11.193 (set to open at a specific pressure), and check valves, for valves FIG. 11.188 and FIG. 11.190, enable the system to be used continuously. In the latter configuration, the receiving compartment is separated from the sludge compartment. The wastewater is pumped from the receiving compartment to the sludge compartment. In a particular embodiment, for example, a single, multi-channel peristaltic pump simultaneously pumps equal volumes of the wastewater from the receiving compartment to the sludge compartment and the sludge from the bottom of the sludge compartment to the filter cake compartment through a press. This simultaneous transfer of volume from one compartment to another minimises the required pump power required to counterbalance the pressures. The pump will be turned on as soon as the liquid volume of the receiver exceeds a specific limit.

16.1 The gas produced and stored in pressure buffer chambers may be directed towards various devices. During this flow, the gases will drive the turbine and alternator in order to produce electric current.

16.2 In certain embodiments, the gases derived from the buffer compartments may be used directly or combined with municipal gas or butane in special mixing regulators, in order to be used as fuel for boilers or ranges.

Figure 12:
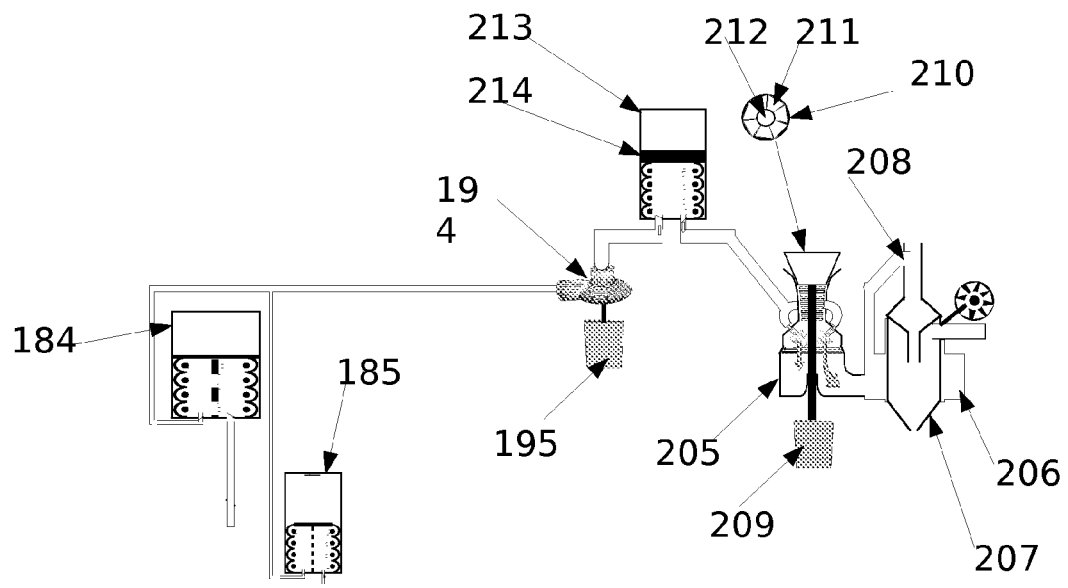
FIG. 12 is a schematic view showing how the air is supplied to the gas turbines.

16.3 In a preferred embodiment, the fermentation gases originating, for example, with the buffer pressure compartments, will be used in motors or gas turbines FIG. 12.205, in order to produce hot combustion or exhaust gases which will be injected into the spray pump system, e.g., into heat exchangers to produce hot air used in the spray pump. In a preferred embodiment, the exhaust and combustion gases are directed into the insulating enclosure FIG. 12.206 of the crystallisation cyclone FIG. 12.207 so as to evaporate the water droplets of the aerosol into vapour. Upon exiting the insulating chamber of the cyclone, the exhaust gases (water vapour+CO2) and the water vapour exiting the crystallisation cyclone can be mixed together to undergo the same distillation and condensation treatment FIG. 12.208. In a preferred embodiment, the gases at the outlet of the insulating chamber are treated separately from the vapours exiting the crystallisation cyclone. The combustion in the turbines or other types of motors will simultaneously enable electric current and/or domestic hot water to be produced, while coupling said turbines with heat exchangers (water/exhaust gases) or with electrical generators FIG. 12.209. In certain embodiments, a pressurised buffer chamber with a very low return stiffness constant can be inserted between the turbine FIG. 12.194 (pressurised gas) and the gas turbine FIG. 12.205. This will preferably consist of a pressurised chamber FIG. 12.213 the return force of which is ensured solely by the weight of the piston FIG. 12.214.

16.4 In certain embodiments, the gases produced during gasification, which come from the buffer pressure compartments, for example, are used after or optionally before the combination thereof, in place of the air in the air system, in order to actuate the spray pump.

16.5 Solar energy may be used so as to improve filtration in the sludge compartment, while increasing the gas pressure of said compartment. In this embodiment, a deflector or optical lens, e.g., a Fresnel lens FIG. 11.196, concentrates the radiation in the buffer pressure chamber through the transparent wall FIG. 11.198, and more particularly on the movable piston FIG. 11.197. The piston will preferably be made of a black-coloured metal, black chrome, CERMET). The increase in temperature inside the chamber increases the gas pressure.

17.1 In certain embodiments, the air used to supply the gas turbines FIG. 12.205 comes in part from household air exhaust systems (toilet bowl exhaust, CMV exhaust, range hood exhaust, agricultural building exhaust . . . ) owing to a air supply structure FIG. 12.210 which divides the air intake of the turbine into sectors. Each of the channels of the air supply structure FIG. 12.11 is connected to a particular air system (toilet bowl, CMV, hood . . . ) enabling air originating in said particular air system to be selectively drawn into the turbine. Flaps enable the suction rate of each channel to be controlled. One channel 212 is reserved for drawing in ambient air. In some cases, the turbine can account for the exhaust mechanisation of dwellings and buildings.

KEY TO ALL OF THE FIGURES

1) wick
2) pipe
3) pore of the pipe
4) spray cyclone
5) bottom opening of the cyclone
6) central gas upflow cylinder of the spray cyclone
7) angled gas supply fins of the cyclone
8) pipe fins enabling a linear flow of the gases
9) suction tube
10) spray cyclone
11) air pump
12) floor of the air compartment of the air pump
13) air intake of the air compartment of the air pump
14) ceiling of the air compartment
15) air compartment of the spray pump
16) inner structural element of the air compartment for orienting the gases towards the central cyclone of the air compartment
17) spray pump channel
18) cylinder of the ultrasound-emitting structure
19) inverted cone-shaped skirt of the bottom of the cylinder of the ultrasound-emitting structure
20) semi-annular skirt of the bottom of the cylinder of the ultrasound-emitting structure
21) hemi-spherical rosette-like skirt of the bottom of the cylinder of the ultrasound-emitting structure
22) annular opening surrounding the spray pump
23) ultrasound source, piezo-electric crystal system
24) water supply inlet of the spray pump
25) spray pump head
26) tangential entry of the crystallisation cyclone
27) crystallisation cyclone
28) wave guide
29) magnetron
30) inverted cone structure with a concave surface
31) lateral slots of the cyclone gas upflow sheath
31-prime) lateral slot fins of the inner side of the cyclone oriented in the direction of rotation of the gas vortex
32) particle filter 32 having a beehive structure made of cordierite or silicon carbine
33) fan arranged above the gas upflow sheath of the crystallisation cyclone
35) air inlet
36) Peltier element
37) cold face of the element of the Peltier element, optionally provided with angled spokes 38) finned radiator for dissipating the heat from the Peltier element
39) heated dry air
40) drainage duct
41) fan
42) fan radiator
43) compression fan blade
44) compression cone
45) expansion tank
46) exhaust fan blade
47) cold face of the Peltier element
48) Peltier element
49) cooling bars, spokes or fins
50) air flow system
51) tubular cooling radiator of the fans wherein the air being heated flows
52) fan motor
53) tubular cooling radiator of the Peltier elements wherein the air being heated flows
54) siphon tank
55) drain opening
56) preferred operating direction, H for top and B for bottom
57) conical plate, made of metal, for example, and oriented downward
58) lower face of the last plate
59) junction between the plates
60) element structuring the inner face of the expansion cylinder
61) Peltier elements arranged in a ring
62) drain outlet
63) siphon
64) pore communicating with the centre of the ring
65) hollow thermal shield
66) radiator of the fan motor
67) fan blade
68) spoke or bar connecting the various radiators
69) additional radiator
70) humid air intake
71) radiator of the Peltier elements arranged in a ring
72) upper sheet transparent to light (visible, UV, infrared)
73) lower sheet capable of reflecting light
74) silica or quartz crystals (quantum particles) enabling the UV rays to be transformed into visible and infrared light
75) spherical cavities structured under the effect of the gas pressure
76) capillary arranged at the centre of a line of bubbles of the matrix of bubbles
77) sunlight converging under the effect of the spherical shape of the bubbles
78) enclosure one of the walls of which consists of an elastic membrane (buffer pressure chamber)
79) elastic membrane
80) air inlet duct
81) air outlet duct
82) outer insulating pipe, made of a transparent material, of the system of nested pipes of the solar concentrator
83) inter-wall space of the outer insulating pipe comprising an insulating gas or void established between the walls of the insulating enclosure
84) overall inverted cone-shaped enclosure surmounting and closing the insulating pipe
85) overall symmetrically conical enclosure surmounting and closing the insulating pipe
86) dark-coloured, centre pipe flared at the end thereof and arranged at the centre of the structure, consisting of the insulating tube and the cavity surmounting same
86a) inner wall of the centre pipe
86b) outer wall of the centre pipe
86c) channel of the centre pipe
87) rotor surmounting the flared centre pipe comprising vanes or fins
88) second rotor rigidly connected to the rotor 87 having vanes or fins arranged around the flared portion 86
89) rotor vanes or fins 86
90) rotor vanes or fins 88 inverted relative to fins 89
91) connecting support between the first and second
92) rotor support surmounting the flared centre pipe
93) solar reflector forming a parabola (sphere cap)
94) reflecting upper membrane of the solar reflector
95) insulating lower membrane of the solar reflector
96) triangular part for assembling the membranes according to the principle of an umbrella canvas
97) assembly of the two deflector membranes
98) free slot for housing the frame in the assembled membranes of the deflector
99) frame stiffener consisting of a bundle of three tubes: a highly heat-conductive hollow tube 7.100 and two flexible tubes
100) highly heat-conductive hollow tube made of metal (copper, aluminium, etc.) for conveying the gases
101) flexible tubes made of carbon or a natural fibre, such as bamboo fibres, for structuring the assembled membrane
102) flexible end piece for connecting the tubes 100 to the insulating pipe
103) hinge for folding over the flexible structural tubes 101 at the supporting cylindrical structure 104
104) supporting cylindrical structure for the flexible structure tubes 101
105) pipe forming the perimeter of the parabola connecting the outer free end of the conductive tubes 100, thereby enabling same to be supplied with gas
105-prime) hinge of the pipe forming the perimeter of the parabola
106) air supply via the pipe 105 forming the perimeter of the parabola
107) connection between the various parts of the assembled membrane
108) zip-fastener (zipper), Velcro, magnetic fastener connecting the various parts of the parabola
109) covering flaps concealing the fasteners
110) light-converging lens, vertically perpendicular to the enclosure 85
111) lens vertically perpendicular to the enclosure 84 consisting of a toric lens
112) radiator situated at the flaring of the centre pipe
113) inlet to the condensation radiator
114) condensation radiator forming the septal wall of the radiator enclosure 115
115) heat-insulated radiator enclosure
116) condensation radiator outlet
117) air inlet of the radiator enclosure
118) fan regulating the airflow into the radiator enclosure 115
119) Peltier element
120) plate structure
121) cold pole of the Peltier element 119
122) radiator connecting the hot pole of the Peltier element 119

123) tank collecting the liquids which fall from the column 120. The plates will advantageously be oriented downward. The Peltier element is regulated such that the plates are cooled to a temperature which enables water to condense but not that of the of the additive. For an additive such as alcohol, the preferred temperature will be between 100° C. and 80° C.
124) top outlet of the column
125) inner distillation column
126) cylinder section tube perforated with holes
127) tube hole
128) ellipsoid arrangement of the holes and plates, according to a chosen rotation and translational movement
129) upwardly angled cooling plate
130) end of the plate 129 in contact with the cold face of a Peltier element
131) Peltier element
132) curvature of the edges of a plate 129
133) trough of plate 129
134) rim of plate 129
135) pores perforated in proximity to the attachment of plate 129, thereby enabling the condensed water to pass onto the lower face of the plate
136) hole rim enabling the condensed liquids in the two troughs 133 to flow into the hole
137) inner wall of the hole 127 covered with a heat-insulating material
138) heating plate with downwardly angled bore holes
139) portion of the plate 138 glued to the hold 127
140) portion of the plate 138 glued to the heating surface of a Peltier element
141) outer distillation cylinder
141-prime) cooling tube in which air to be heated flows
142) cooling plate cooled by a radiator
143) pore at the base of the attachment of the plate 142, for the passage of the gases
144) extension of the non-parallel plate 142 by means of a parallel plate, starting from the wall
145) radiator of plates 142 and 144
146) air flow into the cooling tube 141
147) discharge of condensate from the active distillation column
148) vapour outlet of the inner and outer tube
149) gas inlet into the active distillation column
150) Peltier element implanted in the wall of the outer cylinder 141 and connected to the parallel 144 and/or non-parallel 142 walls and the radiators 145 enabling electrical current to be produced, owing to the difference in temperature between the two faces
151) receiving compartment
152) collector
153) nested sieves having increasingly smaller meshes, of an inverted cone shape and having a hole at the end of the cones, thereby enabling passage of the sludge formed
154) sludge compartment
155) endless screw press
156) filter cake compartment
157) front view, optimised shape of the sludge compartment enabling cleaning
158) incomplete partition separating the sludge compartment from the clear water compartment
159) filter cake compartment
160) gravel/sand/sponge filter tray situated at the top of the incomplete partition
161) filter inserted into the bottom of the incomplete partition 158
162) ultrasound source implanted in the filters of the bottom of the incomplete partition
A) dryer
B) radiator enclosure (enclosure)
C) flexile solar heat panel
D) solar concentrator
E) spray pump
F) crystallisation cyclone
G) radiator enclosure (Radiator)
H) active distillation column
I) alcohol tank
J) water tank
163) supply of water via a siphon provided with floaters and frits with ultrasound sources
164) cleaning duct for the sludge compartment
165) receiver sealed hermetically by a gate at the collector and by a gate at the sludge compartment
166) gate, valve or check-valve for the collector
167) receiving duct terminating in proximity to the bottom of the sludge compartment
168) solenoid valve
169) filter enabling the water to pass between the sludge compartment and the clear water compartment
170) duct provided with a check valve connecting the sludge compartment with an buffer pressure enclosure
171) buffer pressure enclosure
172) elastic membrane with a calibrated stiffness constant k
173) ultrasound source
174) endless screw press
175) movable piston of a given mass, enabling a constant pressure to be maintained
176) flexible cylindrical sleeve, made of a synthetic material impermeable to methane and butane,
177) movable rigid element (piston) for closing the sleeve 176
178) stationary rigid element for closing the sleeve 176
179) return belt (return element) connecting the two rigid elements 177 and 178 of the sleeve
180) spring-like reinforcement of the wall of the sleeve enabling the opening of the sleeve to always remain open. The spring can participate in the return force or replace the return belt.
181) cylindrical rigid container containing the bellows
182) gas supply to the sleeve
183) pressure connector or detector enabling the valves, gates and flaps to be operated
184) buffer chamber or enclosure of the sludge compartment
185) buffer chamber or enclosure of the clear water compartment
186) spray pump
187) rigid duct connecting the buffer chamber 184 to the sludge compartment
188) gate, valve or check valve
189) rigid duct connecting the buffer chamber 185 to the clear water compartment
190) gate, valve or check flap
191) transverse rigid duct connecting the two buffer pressure chambers 184 and 185
192) solenoid valve at outlet to the buffer pressure chamber 184
193) solenoid valve at the outlet to the buffer pressure chamber 185
194) turbine
195) electrical generator/alternator
196) Fresnel lens 197) black-coloured movable piston of the buffer pressure chamber
198) transparent wall of the buffer pressure chamber
199) one of the four weld spots structuring a bubble
200) air inlet duct between the two polymer membranes
201) outlet of the transverse gas duct
202) end of capillary running to the centre of each line of bubbles connected to the transverse gas outlet
203) transverse gas outlet
204) capillary end remaining free and open in the last row of bubbles of the matrix
205) gas turbine
206) adiabatic enclosure insulating the crystallisation cyclone 207
207) crystallisation cyclone
208) mixer for water vapour exiting the crystallisation cyclone and turbine gases
209) alternator acting as a starter and generator
210) segmenting and selecting structure of the air supply of the gas turbine connected to various household or building air systems
211) supply path of the air supply structure for the turbine
212) path reserved for the ambient air
213) buffer pressure chamber having a low return constant (ensured by the weight of the piston)
214) piston weight
215) beehive or foam structure consisting of cordierite ceramic or silicon carbide or ceramic in general.
216) base of the centre pipe, closed by the outer wall 86b
217) opening of the inter-wall space onto the pipe channel
218) ducts enabling the gases to pass from the inter-wall space towards a gas collecting pipe 219
219) gas collecting pipe arranged in the channel of the centre pipe and emerging through the bottom of the centre pipe through the inner wall closing the channel of the centre pipe
220) tubular cavities structured under the effect of the gas pressure
221) semi-conductive nanocrystals
222) capillary the surface of which is current-conducting
223) capillary end remaining free and open
224) outer pipe of the cyclone turbine
225) outer pipe inner wall
226) outer pipe outer wall
227) cyclone inverted cone
228) inverted cone outer wall
229) inverted cone inner wall
230) impeller disk
231) centre hole of the impeller
232) impeller shaft
233) shaft pipe
234) shaft pipe outer wall
235) shaft pipe inner wall
236) base support of the impeller consisting of a ball bearing
237) propellers or vanes arranged as s central rotor in relation to the impeller
238) stationary vanes forming the stator
239) inner cyclone
240) impeller blade
241) impeller shroud
242) outlet pipe of the cyclone
243) outlet pipe of the cyclone outer wall
244) outlet pipe of the cyclone inner wall
245) top bearing of the impeller consisting of a ball bearing
246) oblique gas intake channel consisting of a ball bearing
247) annular chamber transparent to solar radiation
248) suction shaft
249) crystallisation cyclone
250) tube for capturing the rising gases
251) tangential entry of the crystallisation cyclone
252) rotors the blades of which have the same orientation as the impeller blades
253) annular chamber connecting the inner cyclones
254) outlet of the crystallisation cyclone
255) inlet 16.256 to the primary ejector
256) secondary ejector inlet
257) ejector
258) ejector outlet
259) electrical generator
260) pump/ejector
P) peristaltic pump
M) press motor

The invention claimed is:

1. A water treatment method, comprising:
a) filtering the water to be treated,
b) heating a gas utilizing solar thermal energy,
c) utilizing the heated gas to break down the filtered water into drops having a size of between 1 μm and 1 mm in diameter, said drops being suspended in a spray or aerosol,
d) passing the heated gas through a cyclone system and transmitting electromagnetic energy within the cyclone system to further heat and accelerate the heated gas, and utilizing the further heated and accelerated gas to evaporate the water contained in said drops to produce water vapors, salt crystals and agglomerated particles, e) concomitantly to step d), separating the water vapors, the salt crystals and the agglomerated particles in the cyclone system, and f) condensing the water vapors to form desalinated and purified water.

2. The method according to claim 1, wherein the breakdown of the filtered water into drops is completed using ultrasound waves.

3. The method according to claim 1, wherein the electromagnetic energy comprises microwaves having a frequency of between 1 gigahertz and 700 gigahertz.

4. The method according to claim 1, wherein b) heating a gas utilizing solar thermal energy utilizes solar concentrators.

5. The method according to claim 4, wherein said solar concentrators comprise solar heat panels made of flexible materials, which are structured by pressure of gases, the solar heat panels being configured to converge solar radiation at a surface of a network of capillaries.

6. The method according to claim 4, wherein said solar concentrators comprise solar heat panels operating with a heat-transfer gas and an insulating gas, said heat-transfer and insulating gases being the same, and said gases comprising at least one gas selected from the group consisting of dry air methane, butane, isopropane, argon, xeon, tetrafluoroethane, and hydrochlorofluorocarbon.

7. The method according to claim 4, wherein said solar concentrators comprise components selected from the group consisting of solar furnaces and lenses.

8. The method according to claim 1, wherein the water vapors are condensed by active condensation systems.

9. The method according to claim 8, wherein said water vapors comprise vapors produced by the method and vapors present in the atmosphere.

10. The method according to claim 1, wherein the water to be treated is filtered through filters under the action of pressure produced from gasification gases released by fermentation of suspended organic compounds in the water.

11. The method according to claim 10, wherein said filters comprise at least one filtering component selected from the group consisting of sand, a metallic filter, a ceramic filter, a filtration membrane, an ultrafiltration membrane, and pumice stone.

12. The method according to claim 1, further comprising mixing an additive with the water to be treated to an amount of between 0.1% and 90%.

13. The method according to claim 12, wherein said additive is ethanol.

14. The method according to claim 1, wherein the water to be treated is wastewater.

15. The method according to claim 1, wherein said gas is air.

* * * * *